United States Patent [19]

Haws et al.

[11] Patent Number: 5,517,822
[45] Date of Patent: May 21, 1996

[54] MOBILE COGENERATION APPARATUS INCLUDING INVENTIVE VALVE AND BOILER

[75] Inventors: Michael G. Haws, Tulsa; James W. King, Bixby; Glenn R. Gilbert, Tulsa; Donald E. Payne, Broken Arrow; Dennis L. Denton, Owasso; William P. Helean; Cordell Cullens, both of Tulsa; James L. Coombs, Mounds; Dennis L. Messner, Bixby; Tommy R. Cox, Tulsa; Jackie L. Hutson, Broken Arrow; David M. Ketrick, Tulsa; James H. Tighe, Tulsa; George W. Schwerzel, Tulsa; Dennis J. Cousino, Owasso, all of Okla.

[73] Assignee: Applied Energy Systems of Oklahoma, Inc., Tulsa, Okla.

[21] Appl. No.: 77,135

[22] Filed: Jun. 15, 1993

[51] Int. Cl.$^6$ .................................................. F01K 23/10
[52] U.S. Cl. .......................... 60/618; 122/1 R; 237/12.1
[58] Field of Search ...................... 110/234, 240, 110/198, 199; 237/12.1; 60/648; 122/1 R

[56] References Cited

U.S. PATENT DOCUMENTS

| | | | |
|---|---|---|---|
| 1,762,180 | 6/1930 | Marquand . | |
| 1,797,783 | 3/1931 | Meyer | 60/39.18 |
| 1,825,289 | 9/1931 | Smith . | |
| 1,934,193 | 11/1933 | Hynes | 237/12.1 |
| 1,978,837 | 10/1934 | Forsling | 60/39.18 |
| 2,035,747 | 3/1936 | Harris . | |
| 2,604,755 | 7/1952 | Nordstrom et al. | 60/39.18 |
| 2,605,610 | 8/1952 | Hermitte et al. | 60/39.18 |
| 2,677,353 | 5/1954 | Sharp | 122/12 |
| 2,717,491 | 9/1955 | Barr | 60/39.18 |
| 2,961,549 | 11/1960 | Shipitalo | 322/1 |
| 3,053,049 | 9/1962 | Blaskowski | 60/39.18 |
| 3,116,086 | 12/1963 | Barengoltz | 296/28 |
| 3,366,373 | 1/1968 | Reed | 60/39.18 |
| 3,418,003 | 12/1968 | Tate | 280/5 |
| 3,422,800 | 1/1969 | La Haye | 60/39.18 |
| 3,897,773 | 8/1975 | Burt | 126/285 R |
| 4,351,361 | 9/1982 | Worley | 137/625.44 |
| 4,572,110 | 2/1986 | Haeflich . | |
| 4,899,544 | 2/1990 | Boyd | 60/618 |

FOREIGN PATENT DOCUMENTS

| | | |
|---|---|---|
| 0481966 | 4/1992 | European Pat. Off. . |
| 818799 | 8/1959 | United Kingdom . |
| WO91/19893 | 12/1991 | WIPO . |

OTHER PUBLICATIONS

Makansi, J., "Packaged–system options multiply; market direction in question", Power No. 5, pp. 37–39, May 1988.
Makansi, J., "Combined–cycle power plants," Power, No. 6, pp. 91–126, Jun. 1990.
Bulletin 5400 Series "LV" AIRFLO® Line Burners published Feb. 1992 by Maxon Corporation 201 East 18th Street, P.O. Box 2068, Muncie, Indiana 47307–0068
Sales brochure entitled "Kawasaki M1A–13 Gas Turbine" published Nov. 1992 by Kawasaki Heavy Industries limited, 1–1, Kawasaki–Cho, Akashi 673, Japan.

Primary Examiner—Henry A. Bennett
Assistant Examiner—Susanne C. Tinker
Attorney, Agent, or Firm—Dougherty, Hessin, Beavers & Gilbert

[57] ABSTRACT

A cogeneration apparatus comprising: a transporting structure, including a support frame, for transporting the cogeneration apparatus; an electrical generator, mountable on the support frame, for generating an electrical current; a driver, mountable on the support frame, for driving the electrical generator, said driver producing an exhaust gas when operated; and a heat recovery assembly, mountable on the support frame, for recovering heat from the exhaust gas. A novel valve and a novel boiler system preferred for use in the inventive cogeneration apparatus are also provided.

15 Claims, 20 Drawing Sheets

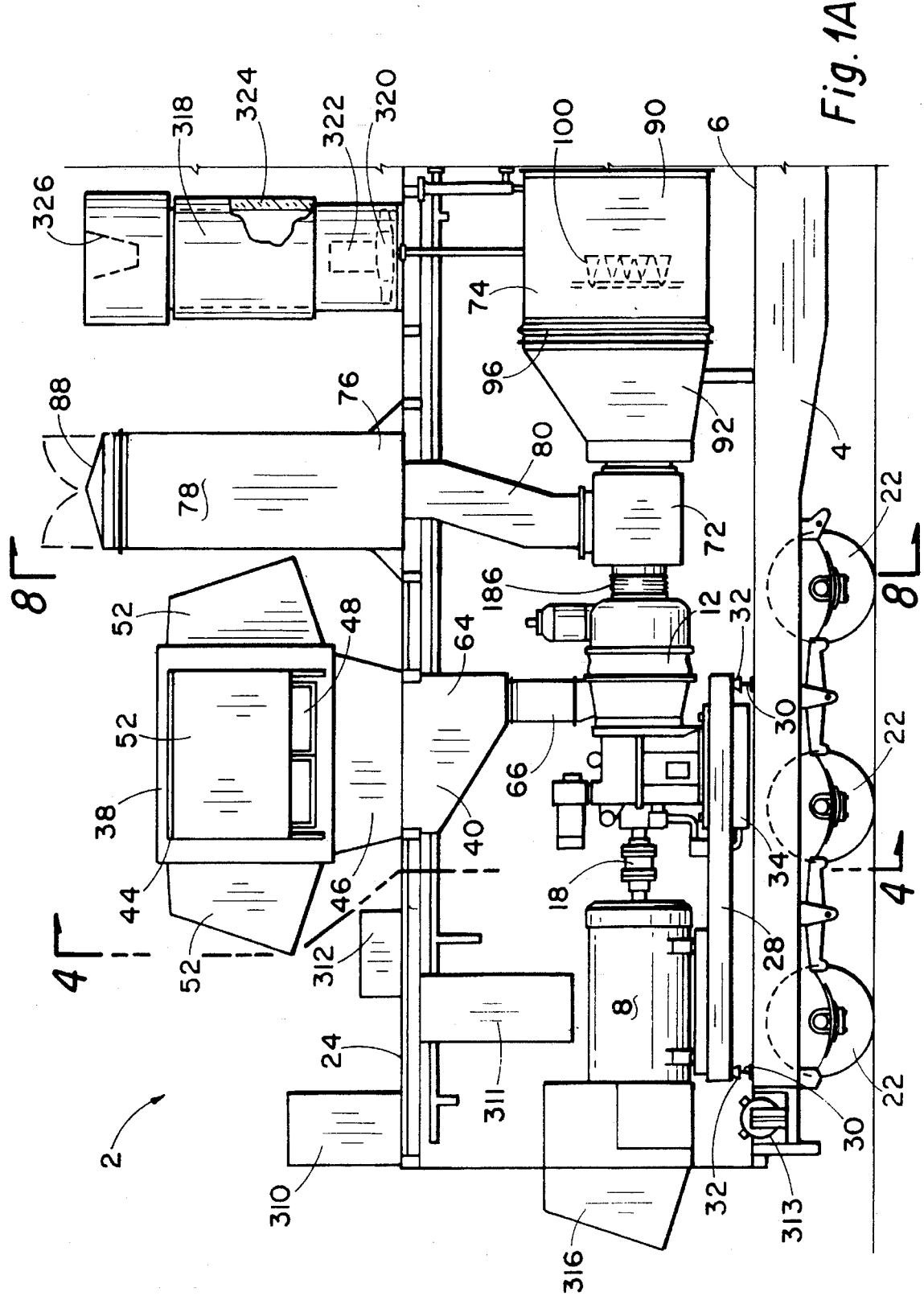

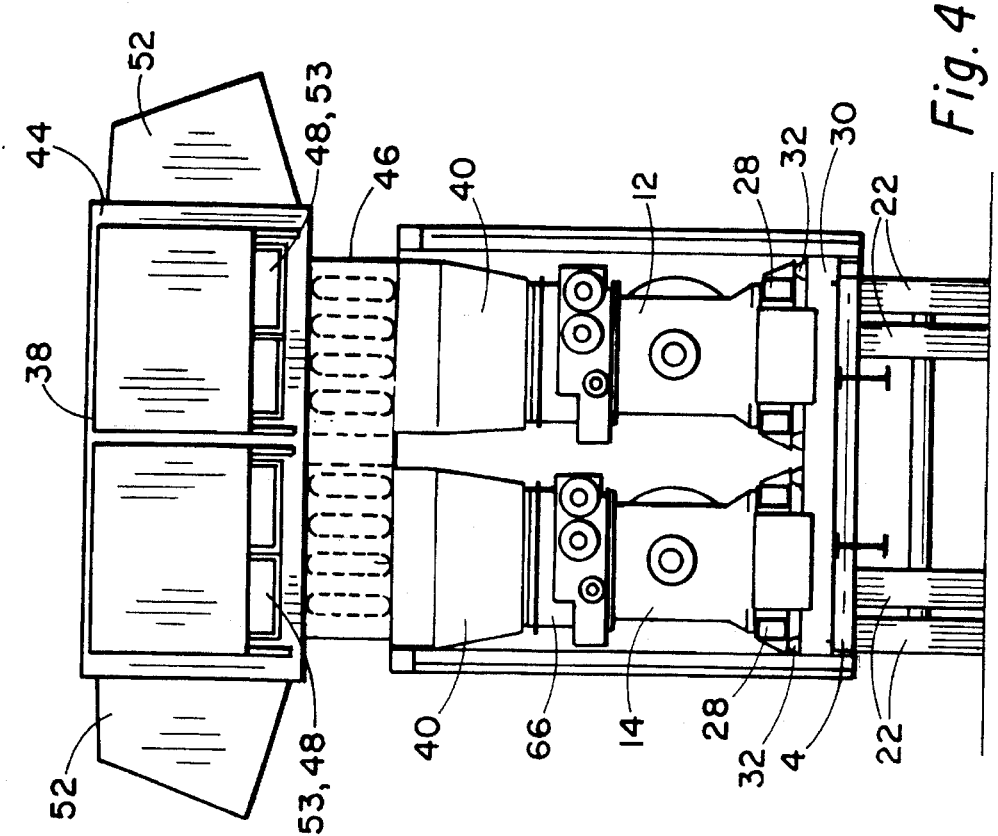
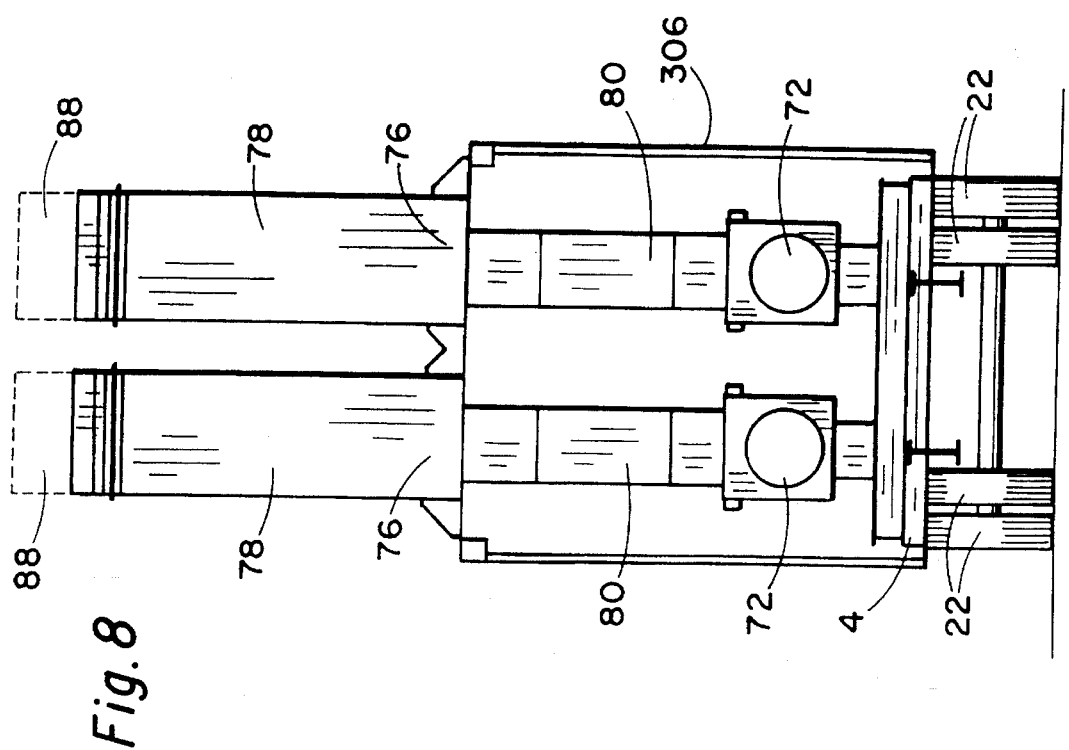

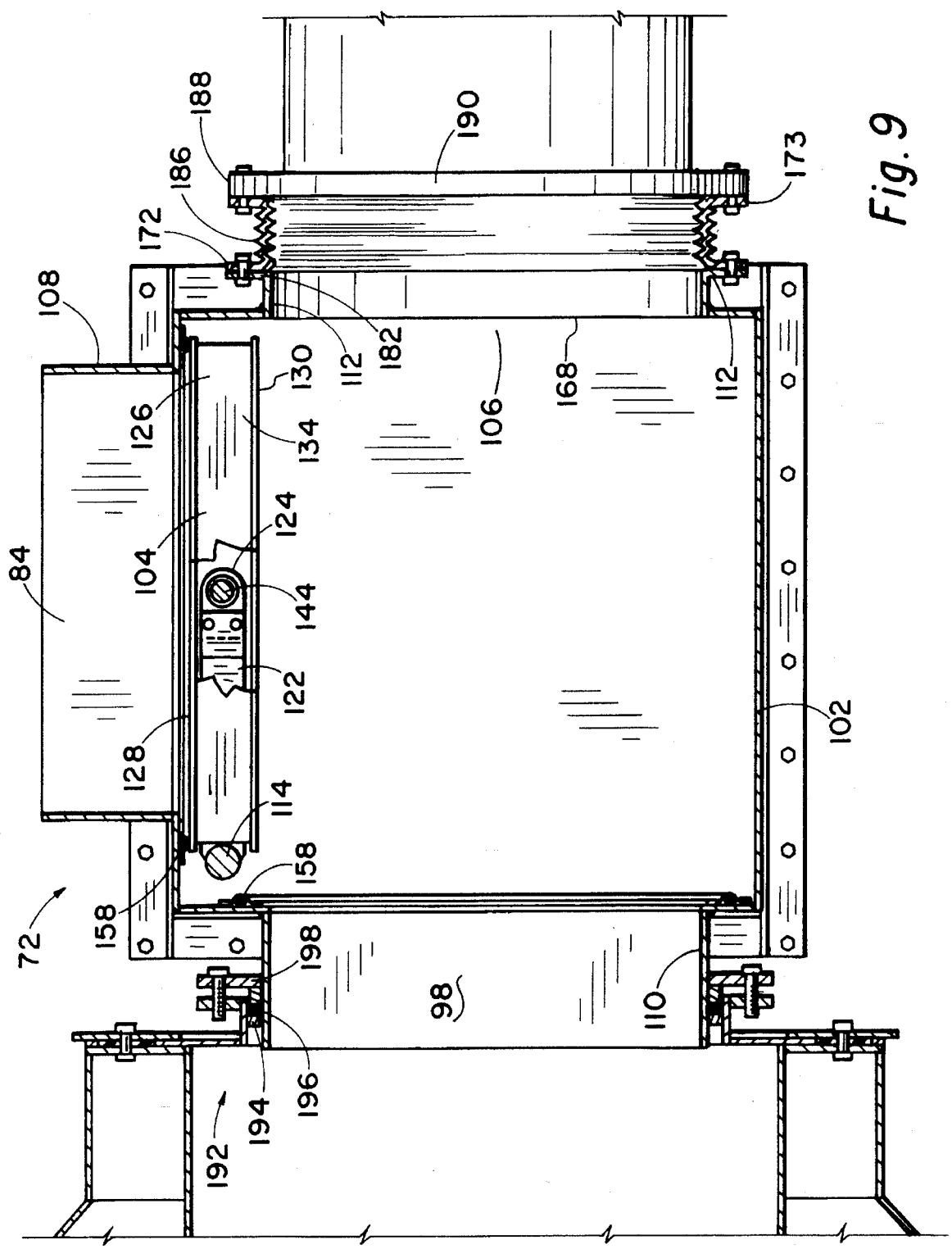

MOBILE COGENERATION APPARATUS INCLUDING INVENTIVE VALVE AND BOILER

FIELD OF THE INVENTION

In one aspect, the present invention relates to mobile cogeneration systems. In another aspect, the present invention relates to valves useful in mobile cogeneration systems. In yet another aspect, the present invention relates to boiler systems useful in mobile cogeneration systems.

BACKGROUND OF THE INVENTION

The capacities and/or efficiencies of electrical and/or steam utility systems serving municipalities, industrial plants, etc. are sometimes inadequate to fully and/or efficiently supply the electrical and/or steam power demands placed on these systems. The inadequacy and/or inefficiency of an existing electrical and/or steam utility system can result, for example, from inefficient design, system breakdowns, natural disasters, rapid demand growth, unforeseen periods of exceptionally high demand, and other such circumstances.

A need presently exists for a supplemental power supply system which can be conveniently and quickly installed and which (a) will supplement the electrical and/or steam output of an existing industrial or municipal utility system and/or (b) improve the overall energy efficiency of an existing utility system. Additionally, a need exists for a supplemental power supply system of the type just described which can be quickly and conveniently transported to substantially any desired location. A need particularly exists for a supplemental power supply system of the type just described which can be quickly and conveniently transported to remote inland locations.

SUMMARY OF THE INVENTION

The present invention provides a cogeneration apparatus comprising: transporting means for transporting the cogeneration apparatus, said transporting means including a support frame; electrical generator means, mountable on the support frame, for generating an electrical current; driving means, mountable on the support frame, for driving the electrical generator means, said driving means producing an exhaust gas when operated; and heat recovery means, mountable on the support frame, for recovering heat from the exhaust gas.

In one embodiment, the present invention provides a mobile cogeneration apparatus comprising: a support structure having a plurality of wheels operably associated therewith for moving the support structure; a first electrical generator mountable on the support structure; a second electrical generator mountable on the support structure; a first engine mountable on the support structure; and a second engine mountable on the support structure. The first engine is associatable with the first electrical generator such that the first engine is operable for driving the first electrical generator. The second engine is associatable with the second electrical generator such that the second engine is operable for driving the second electrical generator. Each of the first and second engines has an exhaust outlet. The mobile cogeneration apparatus further comprises: a boiler mountable on the support structure, said boiler having an exhaust gas inlet; conduit means for conducting exhaust gas from the exhaust gas outlets of the engines to the exhaust gas inlet of the boiler; discharge means for selectively discharging at least a portion of the exhaust gas before the portion of exhaust gas enters the exhaust gas inlet of the boiler; and diverter means for selectively diverting the portion of exhaust gas to the discharge means such that the portion of exhaust gas is prevented from entering the exhaust gas inlet of the boiler.

The present invention also provides a valve which is well-suited for use in the inventive cogeneration apparatus. The inventive valve comprises: a housing having an inlet port, a first outlet port, and a second outlet port; a valve element support which is pivotably mountable in the housing; a valve element which is positionable in the housing; and a pivoting means for associating the valve element with the valve element support such that the valve element is allowed to pivot with respect to the valve element support to at least some extent in substantially any direction. The pivoting means preferably comprises a spherical bearing assembly having a first portion connectable to the valve element support and a second portion connectable to the valve element. The second portion of the spherical bearing assembly is pivotably associatable with the first portion of the spherical bearing assembly.

The present invention further provides a boiler which is well-suited for use in the inventive cogeneration apparatus. The inventive boiler comprises: a housing having an inlet and an outlet; a first drum; a second drum; a first set of vertical boiler tubes positioned inside the housing; a second set of vertical boiler tubes positioned inside the housing; and conduit means for (a) conducting water from at least one of the drums to the first set of boiler tubes, (b) conducting water between the drums, (c) conducting water from at least one of the drums to the second set of boiler tubes, (d) conducting steam from the first set of boiler tubes to at least one of the drums, and (e) conducting steam from the second set of boiler tubes to at least one of the drums.

The inventive cogeneration apparatus includes generally all of the equipment necessary to produce high pressure steam and electrical energy for an industrial or municipal host facility. The installation of the inventive cogeneration apparatus at the industrial or municipal host site is made by connecting a fuel (e.g., natural gas or No. 2 fuel oil) supply line to the inventive apparatus and connecting the steam and electrical product outlets of the inventive apparatus to the steam and electrical systems of the host facility. Additionally, the inventive cogeneration apparatus can be quickly and conveniently transported to substantially any location that can be reached by truck.

Further objects, features, and advantages of the present invention will be apparent to those skilled in the art upon reference to the accompanying drawings and upon reading the following description of the preferred embodiments.

DESCRIPTION OF THE DRAWINGS

FIGS. 1A and 1B provide a partially cutaway elevational side view of an embodiment 2 of the mobile cogeneration apparatus provided by the present invention.

FIG. 4 provides a cutaway rear elevational view of inventive apparatus 2 depicting an inlet air filter, silencer, and ducting system used in inventive apparatus 2.

FIG. 8 provides a cutaway rear elevational view of inventive apparatus 2 depicting simple cycle discharge systems 76 used in apparatus 2.

FIG. 9 provides a cutaway elevational side view of an inventive diverter valve assembly 72 preferred for use in apparatus 2.

In FIG. 10, the top sealing plate 128 of gate 126 has been removed.

DESCRIPTION OF THE PREFERRED EMBODIMENTS

Figure 1B:
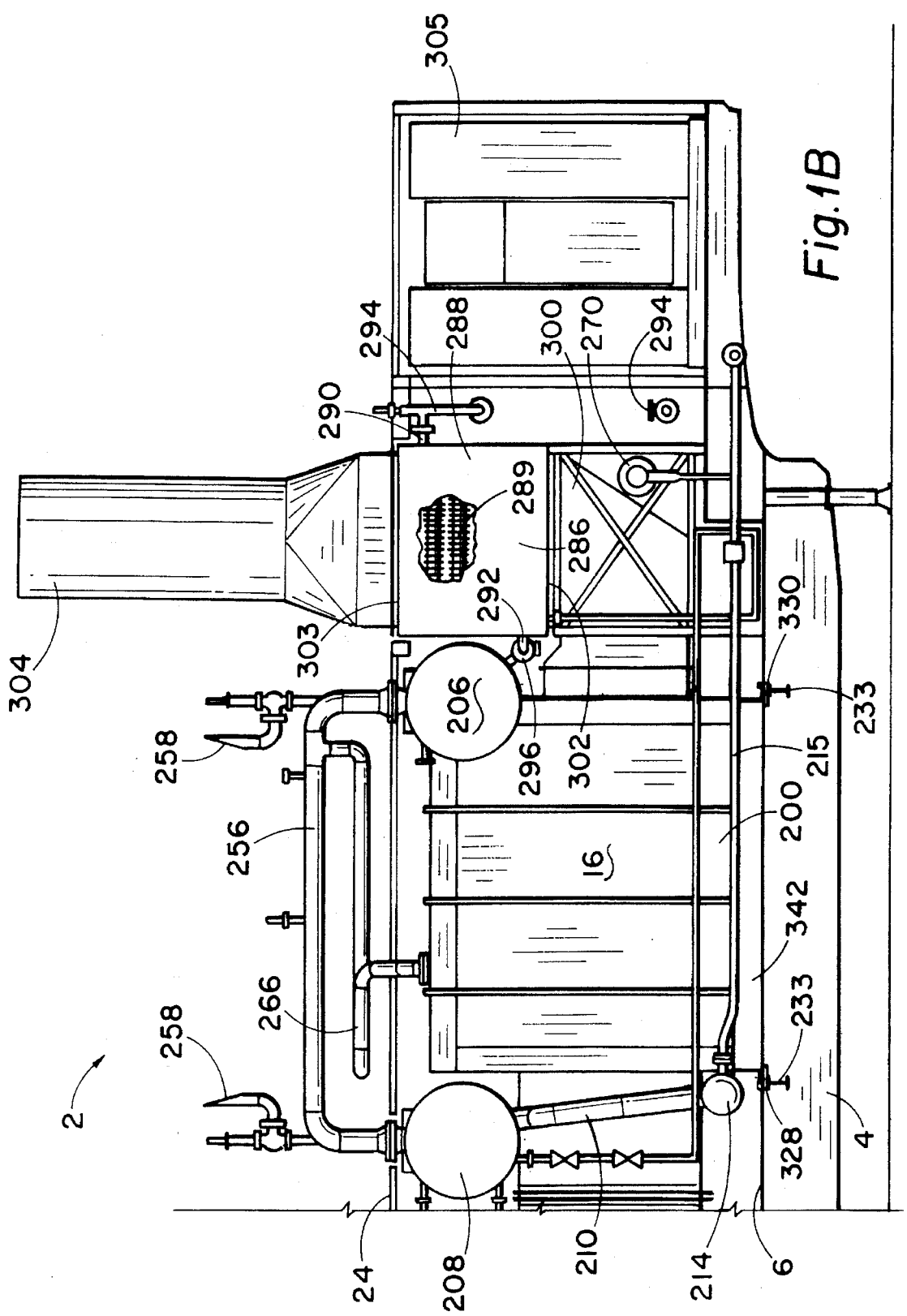
Figure 2A:
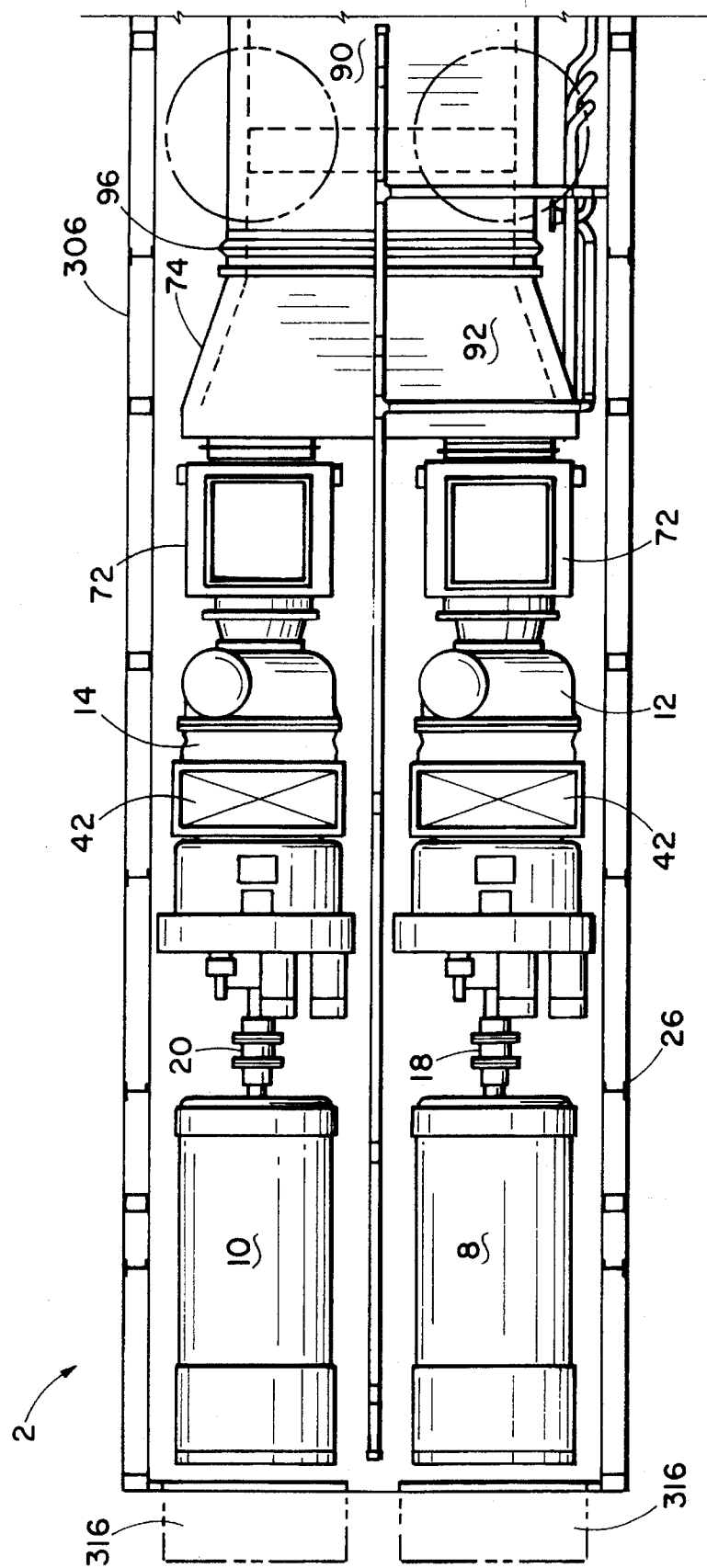
FIGS. 2A and 2B provide a cutaway plan view of inventive mobile cogeneration apparatus 2.
Figure 2B:
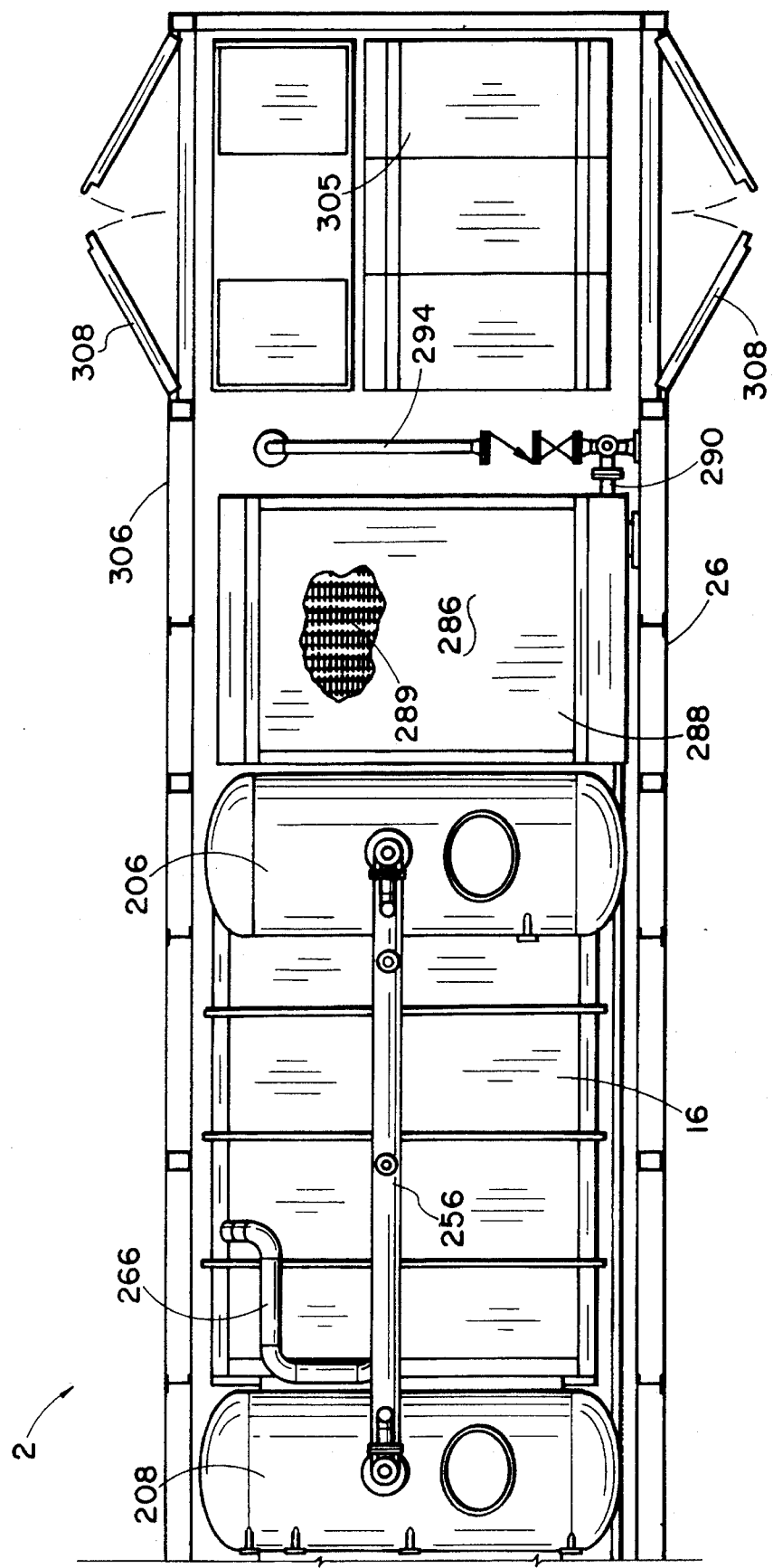
Figure 3:
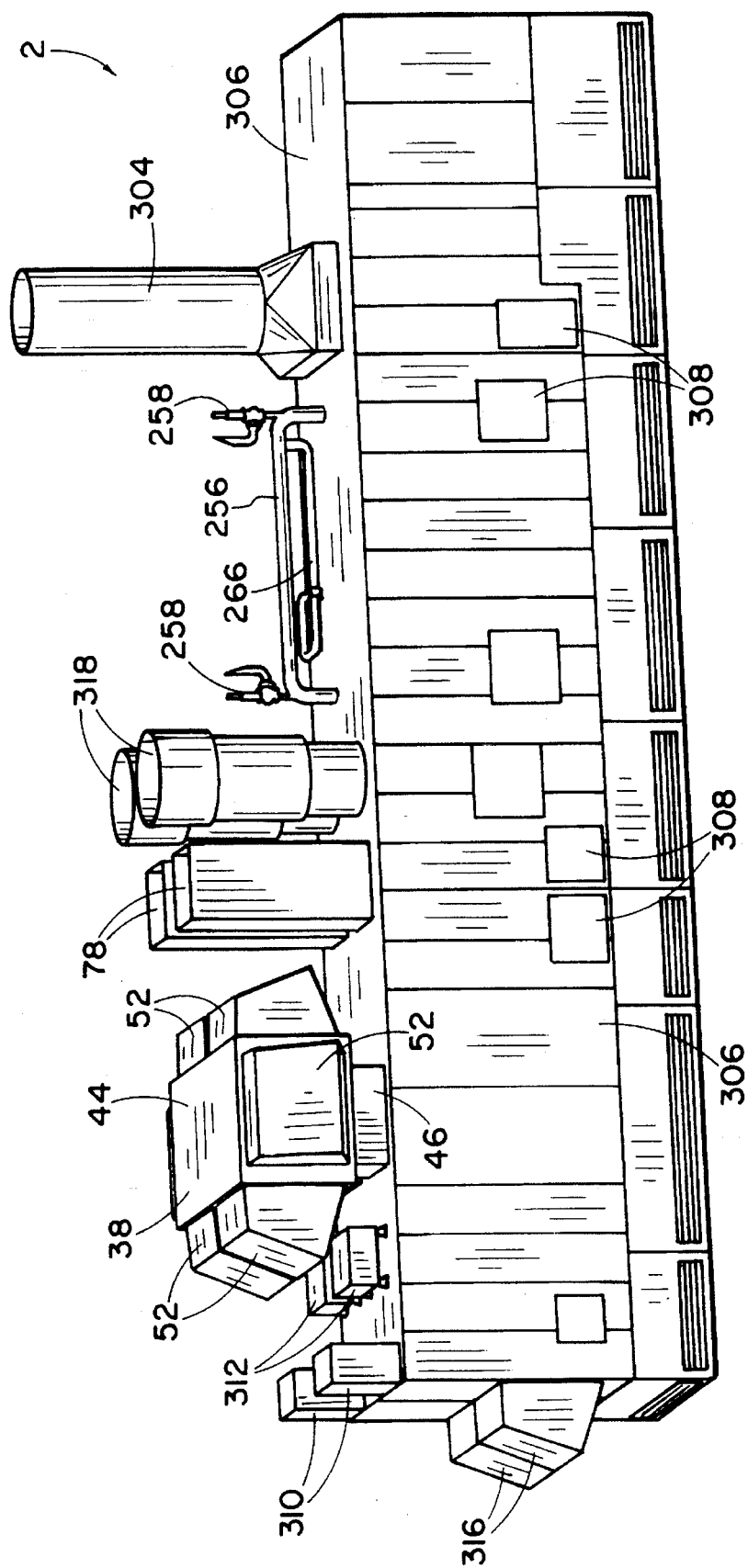
FIG. 3 provides a perspective view of inventive mobile cogeneration apparatus 2.
Figure 6:
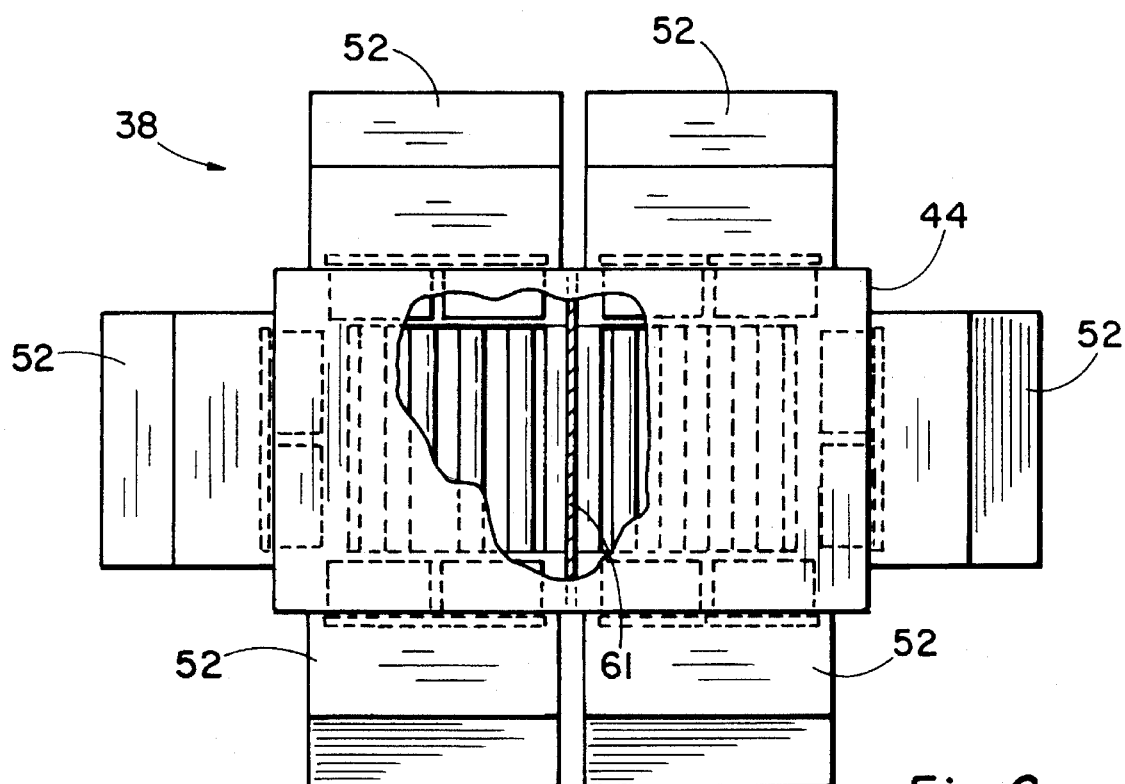
FIG. 6 provides a partially cutaway top view of assembly 38.
Figure 5:
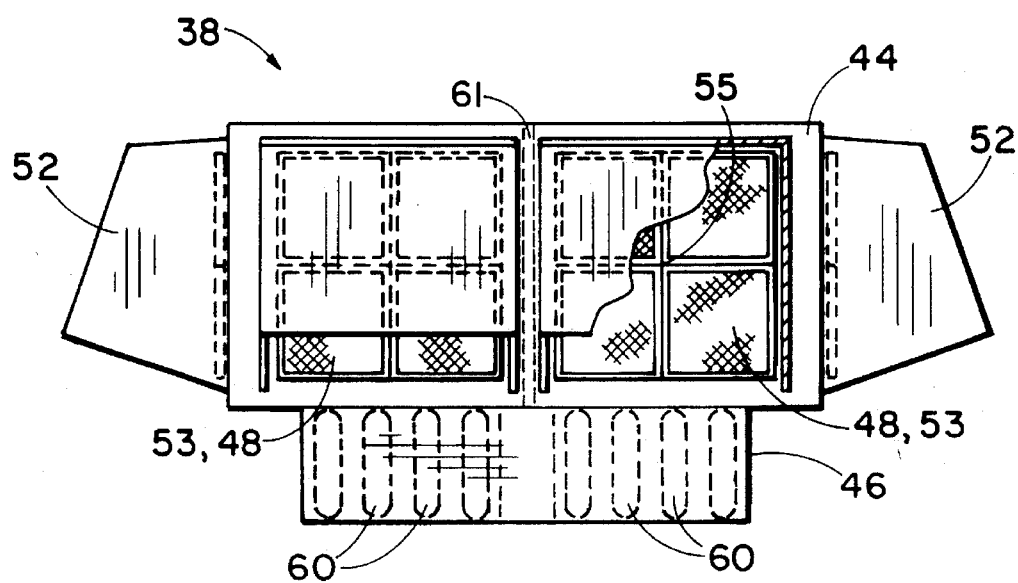
FIG. 5 provides a cutaway elevational rear view of an inlet air filter and silencer assembly 38 used in inventive apparatus 2.

An embodiment 2 of the inventive cogeneration apparatus is depicted in FIGS. 1–3. Apparatus 2 preferably comprises: a trailer frame 4 having a floor 6; a first electrical generator 8 mountable on frame 4; a second electrical generator 10 mountable on frame 4 adjacent first generator 8; a first engine 12 mountable on frame 4; a second engine 14 mountable on frame 4 adjacent engine 12; and a boiler 16 mountable on frame 4. First engine 12 is associatable with first generator 8 via a coupling 18 such that engine 12 is operable for driving generator 8. Second engine 14 is associatable with second generator 10 via a coupling 20 such that engine 14 is operable for driving generator 10. As will be discussed more fully hereinbelow, boiler 16 is operable for producing steam using heat recovered from the exhaust gas flowing from motor 12 and/or motor 14.

Each of electrical generators 8 and 10 is preferably a 1500 kilowatt, 4160 volt, synchronous generator capable of operating at a 0.8 power factor. Each of electrical generators 8 and 10 also preferably includes a permanent magnet generator for excitation, an automatic voltage regulator, and a power factor regulator. Each of generators 8 and 10 preferably operates at a synchronous speed of about 1800 RPM.

Engines 12 and 14 can generally be any type of industrial engine which is operable for driving generators 8 and 10 and which is capable of being mounted on trailer 4. Each of engines 12 and 14 is preferably an industrial gas turbine engine which is powered by the combustion of a combustible fuel (e.g., natural gas or No. 2 fuel oil).

An example of a commercially available gas turbine engine of the type preferred for use in apparatus 2 is the Kawasaki M1A-13A gas turbine engine manufactured by Kawasaki Heavy Industries Limited of Japan. The Kawasaki M1A-13A gas turbine can be powered by natural gas, No. 2 fuel oil, or other such combustible fuels. The M1A-13A engine includes: a two-stage centrifugal air compressor; a spark plug ignited single can combustor; and a three-stage axial combustion gas turbine. The base load performance parameters of the M1A-13A engine operating on natural gas at standard atmospheric conditions (i.e., 15° C. and 14.7 psia) include: a shaft output of 1550 kw; a heat rate of 14.1 MJ/KWHr; an efficiency of 25.5%; a turbine inlet temperature of 990° C.; a mass flow rate of 8.1 Kg/sec; a pressure ratio of 9.4; and an exhaust gas temperature of 518° C.

As shown in FIGS. 1A and 1B, trailer 4 of inventive apparatus 2 is preferably a multi-axle trailer (e.g., a triaxle trailer) having four wheels 22 operably mounted on each axle. Trailer 4 also preferably comprises a roof frame 24 spaced above floor 6 and a vertical frame structure 26 which supports roof frame 24 above floor 6.

Although the embodiment 2 of the inventive cogeneration apparatus depicted in FIGS. 1–3 is mounted on a trailer 4, it will be understood that the inventive cogeneration apparatus can alternatively be mounted on a barge, a skid, or generally any other type of mobile and/or transportable structure capable of supporting the inventive system.

First generator 8 and first engine 12 are mounted on trailer 4 using a rigid engine/generator base frame 28. By attaching both the engine and the generator to a single rigid base frame 28, the alignment between generator 8 and engine 12 is more readily maintained. The rigid base frame 28 is in turn mounted on a pair of transverse supports 30 which are attached to the floor of trailer frame 4. A plurality (e.g., four) rubber isolation mounts 32 are preferably positioned between base frame 28 and transverse supports 30 in order to minimize the amount of vibration transmitted from the generator and the engine to the trailer structure. As also indicated in FIG. 1A, engine 12 is preferably associated with base frame 28 such that the oil reservoir 34 of engine 12 extends down into frame 28 but does not contact the floor of trailer 4.

Second generator 10 and second engine 14 are mounted on trailer 4 using a base frame which is substantially identical to base frame 28.

The air compressors contained in engines 12 and 14 operate to draw air from the atmosphere through an inlet air filter and silencer assembly 38 and through air ducts 40 which are connected between assembly 38 and the inlet air connections 66 of engines 12 and 14. Inlet air filter and silencer assembly 38 includes an upper housing 44 and a silencer housing 46 positioned beneath upper housing 44. Upper housing 44 has four vertical sides with six openings 48 positioned therein. Six rainhoods 52 having trash screens in the openings thereof are preferably removably connected to the exterior of upper housing 44 such that each opening 48 is covered by a rainhood 52.

Each of openings 48 is preferably covered by a two-stage filter element assembly 53. To allow easy removal and replacement from outside of upper housing 44, filter element assemblies 53 are preferably secured in openings 48 using retaining bars which are attached (e.g., using wing-nuts) to the exterior portions of upper housing 44 surrounding openings 48 and to the cross pieces 55 provided in openings 48. Each two-stage filter assembly 53 preferably comprises (a) a first stage filter element which is cleanable and reusable and (b) a second stage filter element which is a pleated, disposable, high efficiency filter element which will remove substantially all (preferably at least about 99.9%) particulates larger than 1 micron.

A barrier 61 is provided in upper housing 44. Barrier 61 divides and isolates one side of inlet air filter and silencer assembly 38 from the other side of assembly 38 such that engine 12 receives air via only three of the openings 38 provided in assembly 38 while engine 14 receives air via only the other three openings 48 provided in assembly 38.

Figure 7:
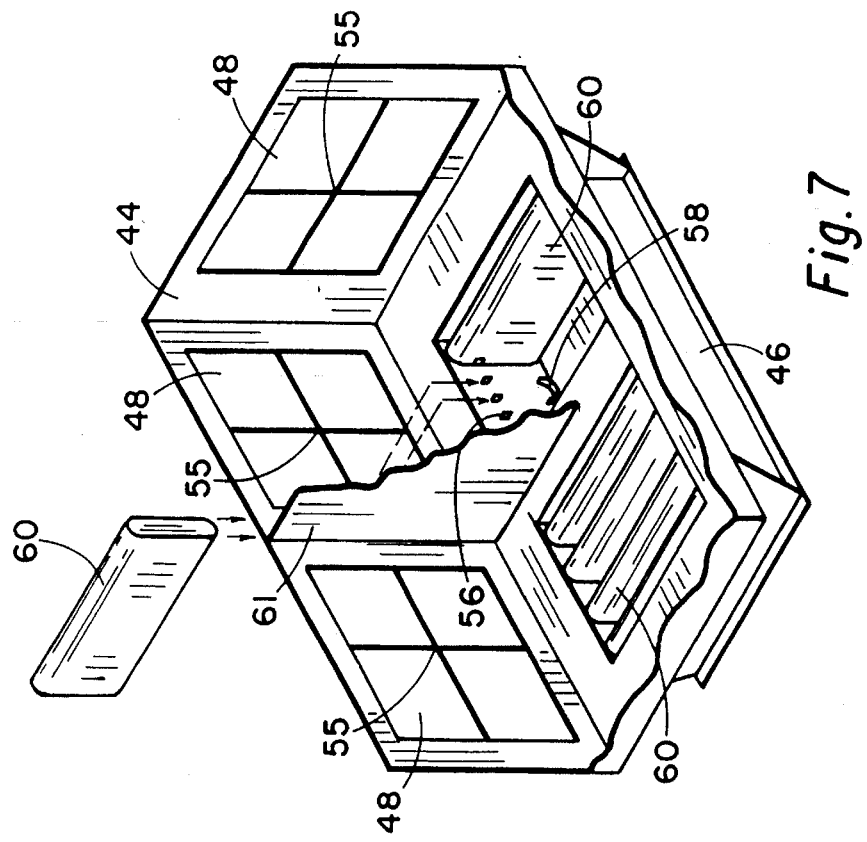
FIG. 7 provides a cutaway perspective view of assembly 38.
Figure 19:
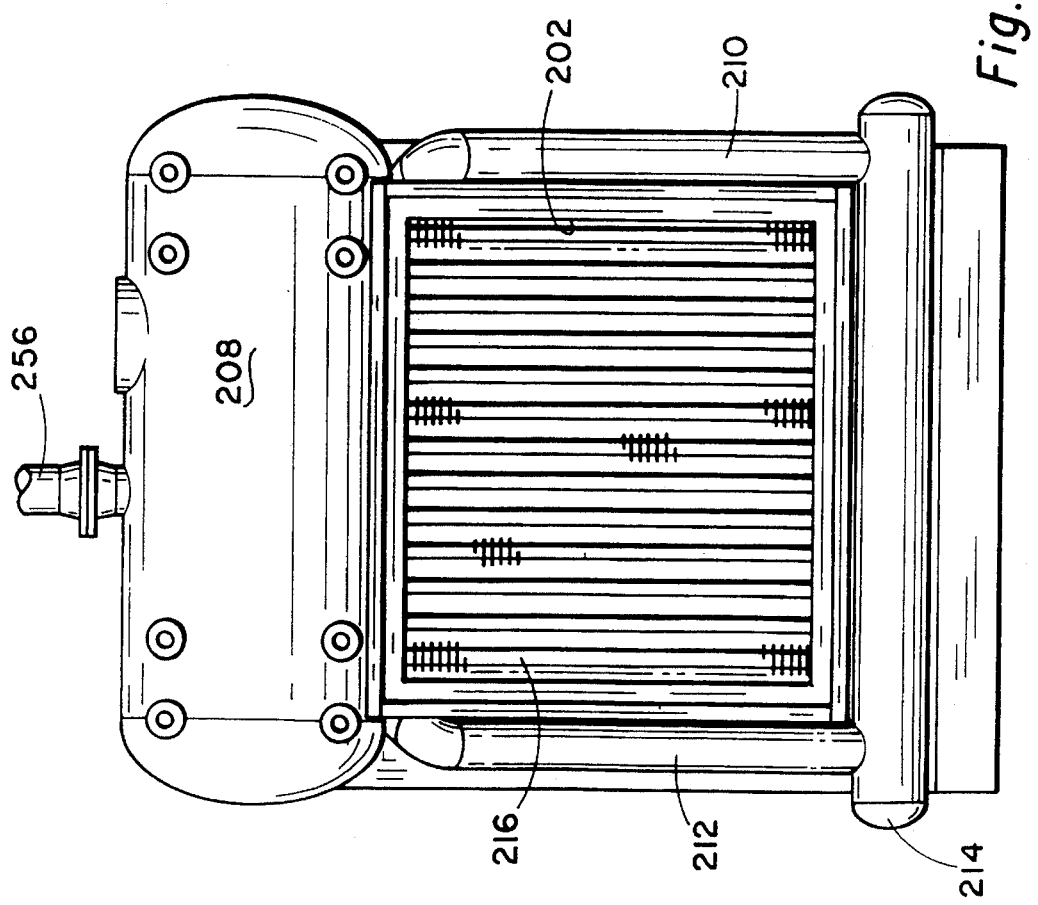
FIG. 19 provides an elevational front view of boiler assembly 16.

Silencer housing 46 has a series of baffle panel locator clips 56 and baffle panel support clips 58 connected therein as shown in FIG. 7 for positioning and supporting a plurality (e.g., eight) standard removable baffle panel elements 60 in housing 46. As depicted in FIG. 7, baffles 60 can be added to or removed from silencer housing 46 by: (a) removing one or more rainhoods 52 and air filter element assemblies 53 from upper housing 44; (b) adding and/or removing one or more baffles 60 from silencer housing 46 by feeding the baffles through an opening 48; and (c) remounting the filter element assemblies 53 and rainhoods 52 which were removed from upper housing 44 in step (a).

The structure of inlet air filter and silencer assembly 38 advantageously allows baffle elements 60 to be easily removed from silencer housing 46 when the maximum amount of noise abatement provided by baffle elements 60 is not required. Since baffle elements 60 partially block the flow of air through silencer housing 46, the removal of baffle elements 60 from housing 46 improves the operating efficiency of inventive cogeneration apparatus 2.

Inlet air filter and silencer assembly 38 is preferably bolted to the top of roof frame 24. Air duct assemblies 40 are also preferably connected to roof frame 24 so that inlet air filter and silencer assembly 38 can be conveniently unbolted from roof frame 24 and removed from inventive cogeneration apparatus 2 when apparatus 2 is to be transported to another location. Openings are provided in roof frame 24 to allow the free flow of air from filter and silencer assembly 38 to duct assemblies 40.

The inlet air connection 66 of the Kawasaki M1A-13A engine includes a built-in expansion joint. If, however, the particular engine used does not include a comparable feature, expansion joints or similar means can be provided in duct assemblies 40 to facilitate assembly and to allow for thermal expansion.

Exhaust gas from engines 12 and 14 is conducted to boiler 16 via diverter valves 72 and a hot exhaust duct 74. Alternatively, diverter valves 72 can be used to divert some or all of the exhaust gas from engines 12 and 14 to a simple cycle discharge system 76.

Each simple cycle discharge system 76 includes a discharge stack 78, which is boltable to roof frame 24 of trailer 4, and a duct 80. Ducts 80 are connected to roof frame 24 and to diverter valves 72. Discharge stacks 78 can be conveniently unbolted and removed from roof frame 24 of trailer 4 before transporting inventive cogeneration apparatus 2 to another location. Openings are provided in roof frame 24 to allow the free flow of exhaust gas from ducts 80 to discharge stacks 78. Damper doors 88, or similar members, are preferably provided at or near the tops of discharge stacks 78 for closing stacks 78 when the simple cycle discharge systems 76 are not in use so that rain, birds, animals, etc. are prevented from entering stacks 78.

Hot exhaust duct 74 includes a large rectangular duct portion 90 extending from boiler 16 toward diverter valves 72 and a diverging/converging duct portion 92 extending from rectangular duct portion 90 to the horizontal outlet ports provided in diverter valves 72. An expansion joint 96 is provided in rectangular duct portion 90 to allow for the thermal expansion of the boiler and duct systems.

As shown in FIG. 1A, an in-line duct burner 100, or other heating means, is preferably included in the large rectangular portion 90 of hot exhaust duct 74. When desired, duct burner 100 can be used to add additional heat to the exhaust gas stream flowing through exhaust duct 74 and to thereby increase the amount of steam generated in boiler 16. Duct burner 100 preferably provides direct heating through the combustion of a fuel material such as natural gas, propane, butane, or the like. When the above-mentioned Kawasaki M1A-13A engines are used in inventive cogeneration apparatus 2, the exhaust gas flowing from engines 12 and/or 14 will contain a sufficient amount of excess oxygen to allow duct burner 100 to be operated without injecting air (or some other oxygen source) into duct 74.

Commercial in-line burner assemblies suitable for use in inventive cogeneration apparatus 2 are readily available. Examples of such assemblies include the series "LV" AIR-FLO assemblies manufactured by Maxon Corporation.

Figure 10:
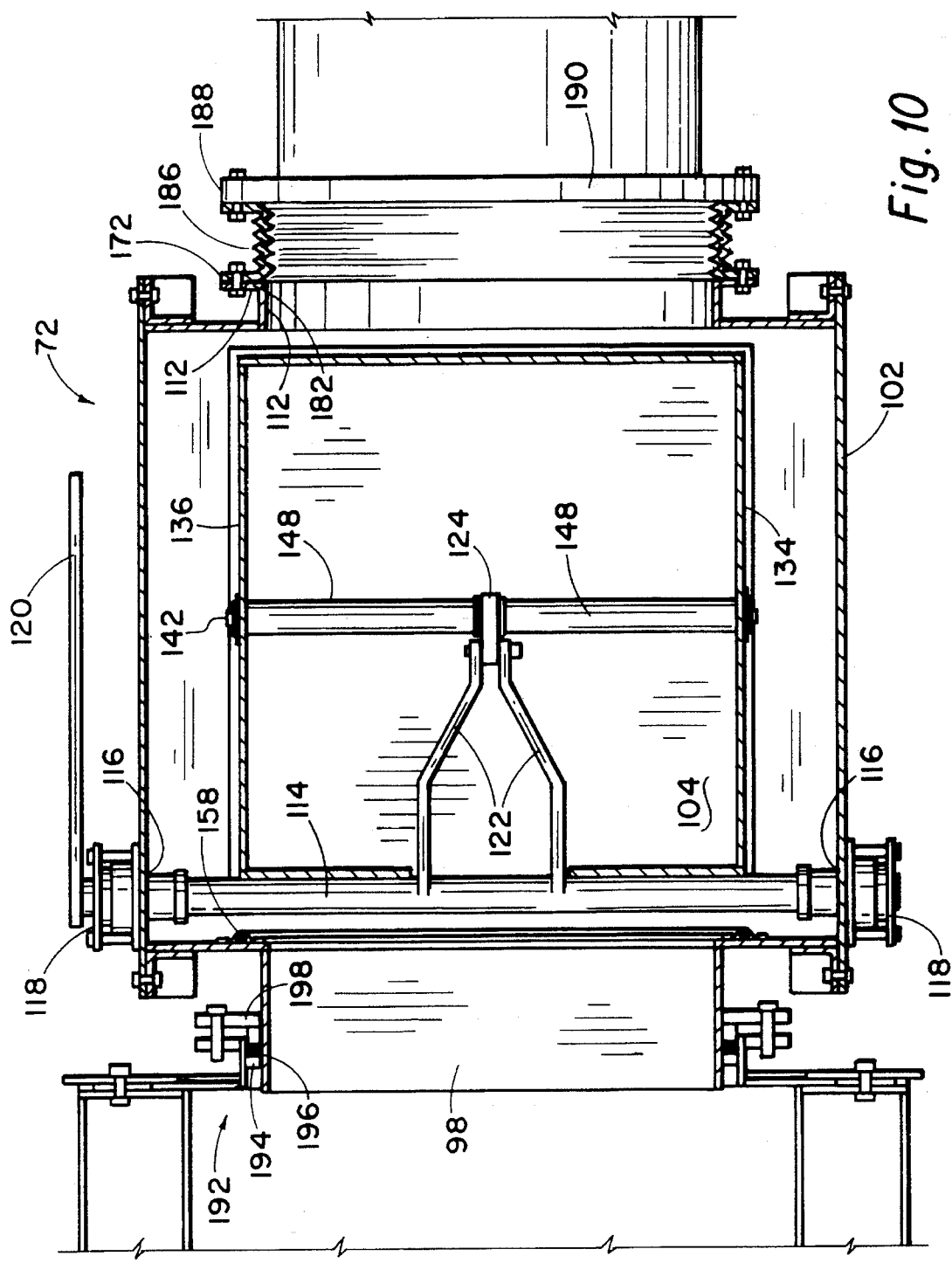
FIG. 10 provides a cutaway top view of inventive diverter valve assembly 72.
Figure 11:
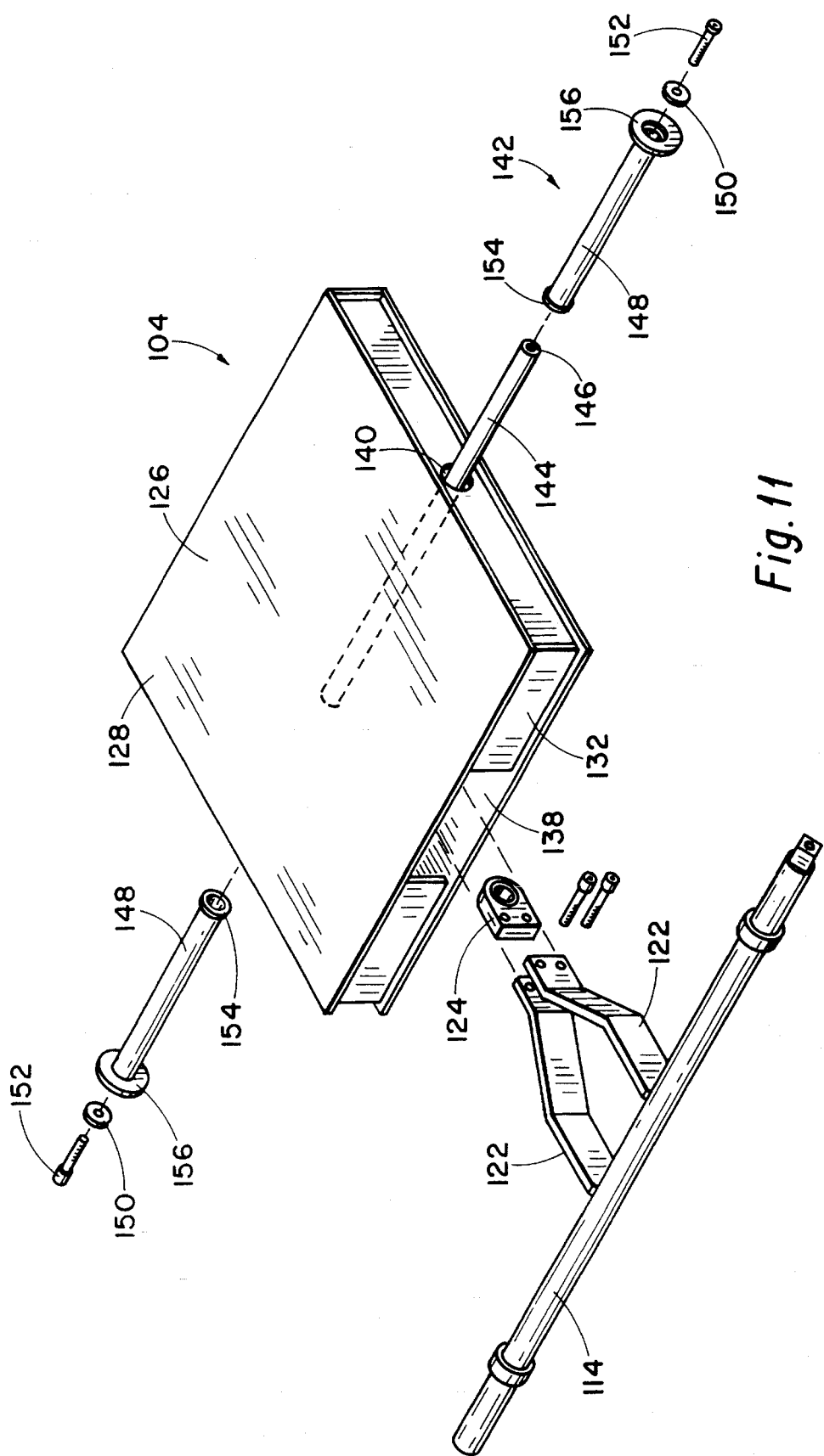
FIG. 11 provides an exploded view of a pivoting gate assembly 104 used in valve assembly 72.
Figure 12:
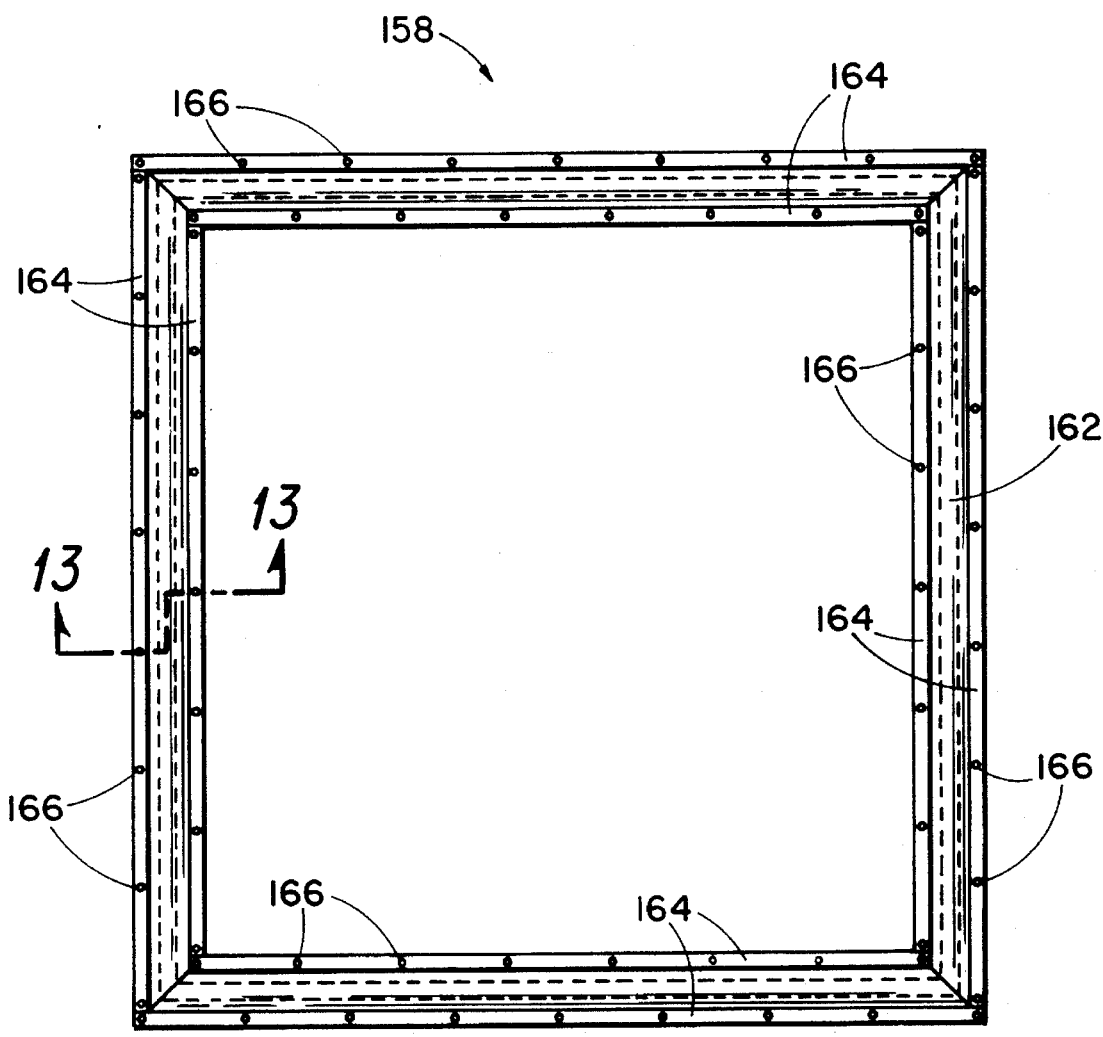
FIG. 12 depicts an outlet seal 158 preferred for use in valve assembly 72.
Figure 13:
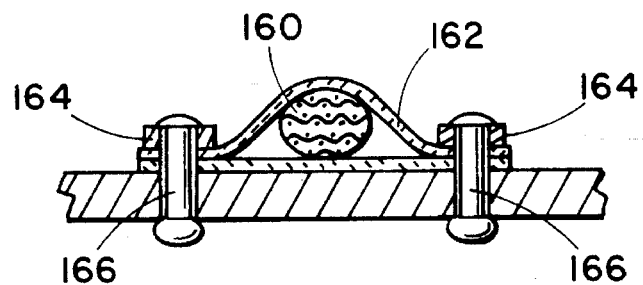
FIG. 13 provides a cross-sectional view of seal 153 taken along line 13—13 shown in FIG. 12.

Various types of diverter valves suitable for use in inventive apparatus 2 are commercially available. An inventive diverter valve 72 preferred for use in cogeneration apparatus 2 is depicted in FIGS. 9 and 10.

Each of inventive diverter valves 72 comprises a housing 102 and a pivoting gate assembly 104 positioned inside housing 102. Housing 102 is substantially a cube-shaped structure having a top outlet port 84, a back outlet port 98, and an inlet port 106. Outlet ports 84 and 98 are substantially rectangular and include rectangular projections 108 and 110. Rectangular projection 108 is used for associating the diverter valve 72 with a simple cycle discharge system duct 80. Rectangular projection 110 is used for associating the diverter valve 72 with hot exhaust duct 92. Inlet port 106 is a substantially circular port which includes a substantially cylindrical flanged projection 112 which is used for associating the diverter valve 72 with the exhaust gas outlet of an engine 12 or 14.

Pivoting gate assembly 104 preferably comprises: an elongate rod 114 which extends through apertures 116 provided in opposite sides of diverter valve housing 102; bearing assemblies 118 connected to the exterior of housing 102 for receiving the ends of elongate rod 114; a control arm 120 connected to one end of elongate rod 114 for rotating elongate rod 114 about its longitudinal axis; a pair of bearing attachment arms 122, each having one end connected to elongate rod 114; and a spherical bearing 124 connected between the distal ends of attachment arms 122.

Pivoting gate assembly 104 further comprises a substantially hollow valve element or gate 126 having: a first large rectangular flat sealing surface 128; a second large rectangular flat sealing surface 130 which lies in a plane which is substantially parallel to the plane of sealing surface 128; a first elongate rectangular side 132 which extends between one edge of sealing plate 128 and a corresponding edge of sealing plate 130; a second elongate rectangular side 134 which extends between an edge of sealing plate 128 and a corresponding edge of sealing plate 130, rectangular side 134 being adjacent rectangular side 132; and a third elongate rectangular side 136 extending between another edge of sealing plate 128 and a corresponding edge of sealing plate 130, rectangular side 136 being positioned adjacent first rectangular side 132 and opposite second rectangular side 134. A slot 138 is provided in elongate rectangular side 132 of gate 126 for receiving bearing attachment arms 122 and spherical bearing 124. Opposing circular holes 140 are provided in elongate rectangular sides 134 and 136 for receiving an elongate rod assembly 142 which is operable for pivotably associating gate 126 with spherical bearing 124.

Elongate rod assembly 142 comprises: an elongate rod 144 having a threaded hole 146 provided in each end thereof; a pair of hollow elongate centering sleeves 148; a pair of washers 150 and a pair of bolts 152. Each centering sleeve 148 has a radially extending inner end portion 154 and a radially extending outer end portion 156. Holes 140 provided in gate 126 and end portions 154 and 156 of sleeves 148 are sized such that inner end portions 154 of centering sleeves 148 are receivable in holes 140 but outer end portions 156 are prevented from traveling through holes 140.

Elongate rod assembly 142 is used to operably associate valve gate 126 with spherical bearing 124 by (a) connecting spherical bearing 124 between bearing attachment arms 122 and then inserting spherical bearing 124 and attachment arms 122 into side slot 138 of gate 126, (b) securing one of centering sleeves 148 over one end portion of elongate rod 144 using a washer 150 and a bolt 152, (c) feeding the uncovered end of elongate rod 144 through one of holes 140 such that the uncovered rod end travels through spherical bearing 124 and projects from the opposite gate hole 140, and (d) securing the second centering sleeve 148 over the uncovered projecting end of elongate rod 144 using the remaining washer 150 and the remaining bolt 152. With elongate rod assembly 142 thus connected through gate 126 and associated with spherical bearing 124, gate 126 is allowed to pivot about bearing 124 to a limited extent (preferably not more than about 3°) in substantially any direction. Gate 126 is preferably free to pivot about ½° in substantially any direction about bearing 124.

Each of diverter valves 72 preferably also includes a pair of outlet seals 158. One of the outlet seals 158 is attached to the interior wall of valve housing 102 about the periphery of outlet port 84. The other outlet seal 158 is attached to the interior wall of housing 102 about the periphery of outlet port 98. Each of outlet seals 158 is preferably comprised of a somewhat compressible, elongate, heat resistant segment 160 contained in a heat resistant fabric sheath 162. Segment 160 is most preferably an INCONEL wire mesh segment and sheath 162 is most preferably a ceramic fabric sheath. Each seal 158 is preferably attached to the interior housing wall using elongate metal retainer bars 164 and a plurality of fasteners (e.g., stainless steel pop rivets) 166. The resulting arrangement provides a soft seal which will compress when contacted by a sealing surface 128 or 130 of gate 126 and will thereby prevent any leakage through the valve by compensating for any irregularities in the sealing surface.

Valve gate assembly 104 is positioned in diverter valve housing 102 such that (a) gate 126 can be pivoted fully upward about the longitudinal axis of rod 114 to a substantially horizontal position to thereby seal outlet port 84 and leave outlet port 98 fully open, (b) gate 126 can be pivoted fully downward to a substantially vertical position to thereby seal outlet port 98 and leave outlet port 84 fully open, or (c) gate 126 can be pivoted to substantially any position between the horizontal and vertical positions just mentioned to thereby divert any desired portion of the exhaust gas entering diverter valve 72 to the simple cycle discharge system 76 associated with the valve.

Inventive diverter valve 72 overcomes substantial problems encountered with diverter-type valves used heretofore in the art. When a valve element is pivoted to seal a valve port, the valve body sealing surface will typically first be contacted by the portion of the valve element sealing surface which is located nearest the valve element pivot point. As a result, the remainder of the valve element sealing surface is commonly prevented from sealingly contacting the valve body sealing surface.

In contrast to the valve assemblies heretofore used in the art, gate 126 of inventive diverter valve 72 is free to pivot about spherical bearing 124 as gate 126 comes in contact with an outlet seal 158. As gate 126 is moved into contact with seal 158, gate 126 will pivot as necessary about spherical bearing 124 such that gate 126 centers itself with respect to seal 158 and thereby fully and sealingly contacts seal 158 about the entire periphery of the outlet port.

The novel, single valve element, tight seal construction of inventive valve 72 also substantially reduces the physical size of valve 72 relative to other valves heretofore available. The reduced size of inventive valve 72 is extremely beneficial in the construction of inventive cogeneration system 2 due to (1) the very limited space available on trailer 4 and (2) the desirability of reducing the total load supported by trailer 4.

Engines 12 and 14 are preferably associated with diverter valves 72 using bellows-type expansion joints 186. Each expansion joint 186 is preferably formed from a stainless steel bellows material. Each expansion joint 186 preferably includes a first circular flange 172 which is bolted to the circular inlet flange 182 of a diverter valve 72. Each expansion joint 186 also preferably includes a second circular flange 173 which is bolted to the circular exhaust outlet flange 190 of an engine 12 or 14.

Expansion joints 186 accommodate the thermal expansion and vibration of engines 12 and 14. Additionally by simply disconnecting and removing expansion joints 186, engines 12 and 14 can be removed from trailer 4 without having to also remove diverter valves 72.

Slip joint assemblies 192 are used for connecting ducts 80 and 92 to the outlet ports 84 and 98 of diverter valves 72. Each of slip joint assemblies 192 comprises: a rectangular lip 194 which projects inwardly from the interior wall of the duct; a ceramic fiber rope 196 which is positioned on lip 194; and a rectangular packing gland 198 which is bolted to the duct and operates to press ceramic rope 196 against rectangular lip 194. Rectangular lip 194 and packing gland 198 are sized such that, when the rectangular projection 108 or 110 of the housing outlet port is positioned in the duct, ceramic fiber rope 196 is urged tightly against the exterior surface of rectangular projection 108 or 110.

Slip joint assemblies 192 provide essentially leak-proof connections between diverter valves 72 and ducts 80 and 92. Additionally, since rectangular projections 108 and 110 of valves 72 can move substantial distances within ducts 80 and 92 while maintaining a tight seal, slip joint assemblies 192 will accommodate a great deal of equipment thermal expansion. Additionally, slip joint assemblies 192 substantially increase the amount of tolerance available for positioning and joining diverter valves 72 and ducts 80 and 92.

Inventive diverter valves 72 perform several useful functions in the operation of inventive cogeneration apparatus 2. For example, when only one of engines 12 and 14 is running and it is desired to start the other engine, the appropriate diverter valve 72 can be used to divert the exhaust gas from the other engine (i.e., the engine being started) to the simple cycle discharge system. Additionally, diverter valves 72 can be used to isolate either of engines 12 and 14 from the exhaust path of the other engine such that, while one of engines 12 or 14 is running, (a) desired maintenance operations can be conducted on the other engine or (b) the other engine can be completely removed from trailer 4. Further, diverter valves 72 can be used to control the amount of exhaust gas reaching boiler 16 such that the amount of steam produced in boiler 16 can be regulated.

An inventive boiler assembly preferred for use in the present invention is depicted in FIGS. 1B, 2B, and 14–21. Boiler 16 comprises: a housing 200 having an exhaust gas inlet 202 and an exhaust gas outlet 204; a first steam drum 206 positioned exterior to housing 200 at the top thereof above outlet 204; a second steam drum 208 positioned exterior to housing 200 at the top thereof above exhaust gas inlet 202; a conduit 210 connected to the bottom of drum 208 at one end thereof and extending downwardly around one side of exhaust gas inlet 202; a second conduit 212 connected to the bottom of drum 208 near the other end thereof and extending downwardly around the other side of exhaust gas inlet 202; and a mud drum 214 extending laterally beneath exhaust gas inlet 202 and having the bottom ends of conduits 210 and 212 connected to the top thereof. In addition to other functions discussed hereinbelow, mud drum 214 operates to collect sediment materials contained in the boiler water and steam system so that these materials can be periodically or continuously removed from the system by means of a blowdown header 215 connected to mud drum 214.

Boiler 16 also includes a vertical tube assembly 216 wherein water is heated by the exhaust gas stream flowing from engine 12 and/or engine 14 to produce steam. Vertical tube assembly 216 comprises 17 separate tube row assemblies which extend in parallel arrangement between the exhaust gas inlet 202 and the exhaust gas outlet 204 of housing 200. Nine of the 17 vertical tube row assemblies are vertical tube row arrangements 220 of the type depicted in FIGS. 14 and 17. The remaining eight vertical tube row assemblies are vertical tube row arrangements 222 of the type depicted in FIG. 18. Tube row arrangements 220 and 222 are assembled in alternating position in housing 200 such that an arrangement 222 is positioned between each adjacent pair of tube row arrangements 220.

Each of vertical tube row arrangements 220 comprises: a conduit 224 which is connected near the bottom of first drum 206 and extends within housing 200 to substantially the bottom of housing 202; a horizontal conduit 226 which extends along the bottom of housing 200 and has a first end connected to the bottom end of conduit 224 and a second end which projects through the wall of boiler housing 200 and connects to mud drum 214; a row of ten vertical finned tubes 230 positioned adjacent the exhaust gas outlet of housing 200 and extending upwardly from horizontal conduit 226; a row of five vertical finned tubes 232 positioned adjacent the exhaust gas inlet end of housing 200 and extending upwardly from horizontal conduit 226; a gap 234 existing between tubes 230 and 232 for receiving a steam superheating unit 236; and a top conduit 238 extending along the interior top of housing 200. All of vertical tubes 230 and 232 are connected to conduit 238. Conduit 238 has a first end adjacent the exhaust gas inlet of housing 200 which is covered and closed by a cap 240. The second end of conduit 238 is connected to steam drum 206. Conduit 238 extends across the inner top portion of housing 200 toward drum 206 at an upward angle of about 2.6°.

Each of vertical tube arrangements 222 comprises: a conduit 242 which is connected substantially to the bottom of steam drum 206 and extends downwardly in housing 200 to near the bottom of housing 200; a horizontal conduit 244 which extends along the interior bottom of boiler housing 200 and has a first end which is connected to the bottom of conduit 242 and a second end which projects through the wall of boiler housing 200 and connects to mud drum 214; a row of ten vertical finned tubes 246 positioned adjacent the exhaust gas outlet of boiler housing 220 which extend upwardly from horizontal conduit 244; a row of five vertical finned tubes 248 positioned adjacent the exhaust gas inlet end of housing 200 which extend upwardly from horizontal conduit 244; a gap 250 existing between vertical tubes 246 and 248 for receiving steam superheating unit 236; and a top conduit 252 which extends across the interior top of boiler housing 200. Top conduit 252 has a first end which is connected to the side of steam drum 208. The other end of top conduit 252 is covered and closed by a cap 254. Top conduit 252 extends upwardly across the top interior of housing 200 toward steam drum 208 at an angle of about 2.6°. The upper ends of all of vertical tubes 246 and 248 are connected to top conduit 252.

When boiler 16 is in operation, a water level is initially established and primarily maintained in steam drum 208 due to the flow of water from steam drum 206 via conduits 224 and 242, horizontal conduits 226 and 244, mud drum 214, and conduits 210 and 212. Conduits 224, 242, 226, 244, 210, and 212 and mud drum 214 also operate to supply water to vertical tubes 230, 232, 246 and 248. The water flowing through vertical tubes 230, 232, 246, and 248 is heated by the exhaust gas flowing through boiler housing 200 and is thereby at least partially vaporized. All of the effluent from vertical tubes 230 and 232 flows via top conduit 238 to steam drum 206. All of the effluent from vertical tubes 246 and 248 flows via top conduit 252 to steam drum 208.

Since all of the steam formed in vertical tube row arrangements 220 flows to steam drum 206 while all of the steam formed in vertical tube arrangements 222 flows to steam drum 208, a substantially balanced flow of steam to drums 206 and 208 is ensured. Consequently, steam drums 206 and 208 (a) will be substantially the same size and (b) will each be relatively small in size such that they are well-suited for use in the limited space available in the inventive mobile cogeneration apparatus.

A conduit 256 is connected between the tops of steam drums 206 and 208 for balancing the steam pressures in drums 206 and 208 and for receiving the steam product delivered to steam drums 206 and 208. A conduit 266 is connected between conduit 256 and the inlet of steam superheating unit 236. Pressure relief valves 258, for protecting boiler assembly 16 from overpressure, are also preferably connected to conduit 256.

Figure 14:
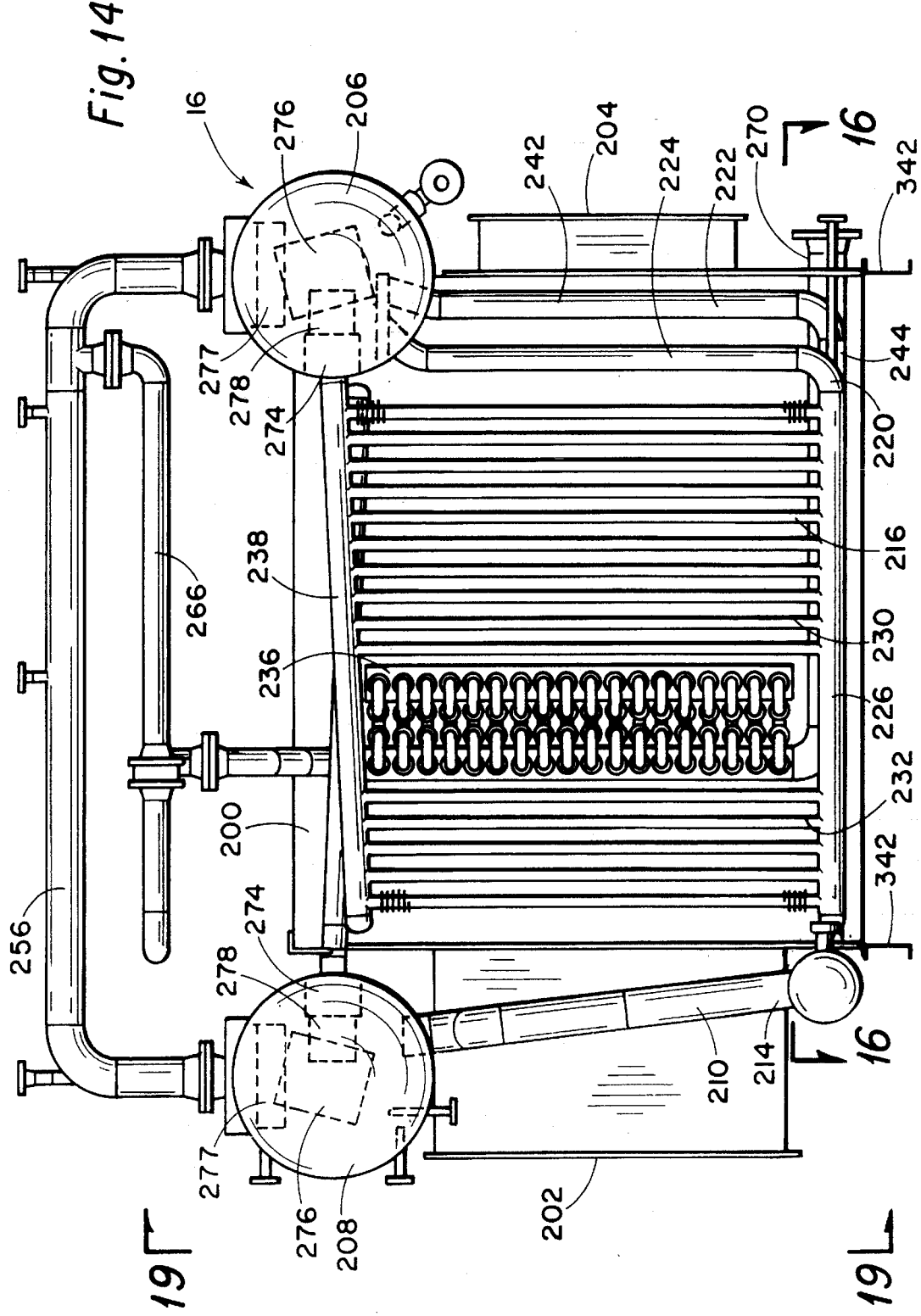
FIG. 14 provides a cutaway elevational side view of a preferred boiler assembly 16 used in inventive cogeneration apparatus 2.
Figure 15:
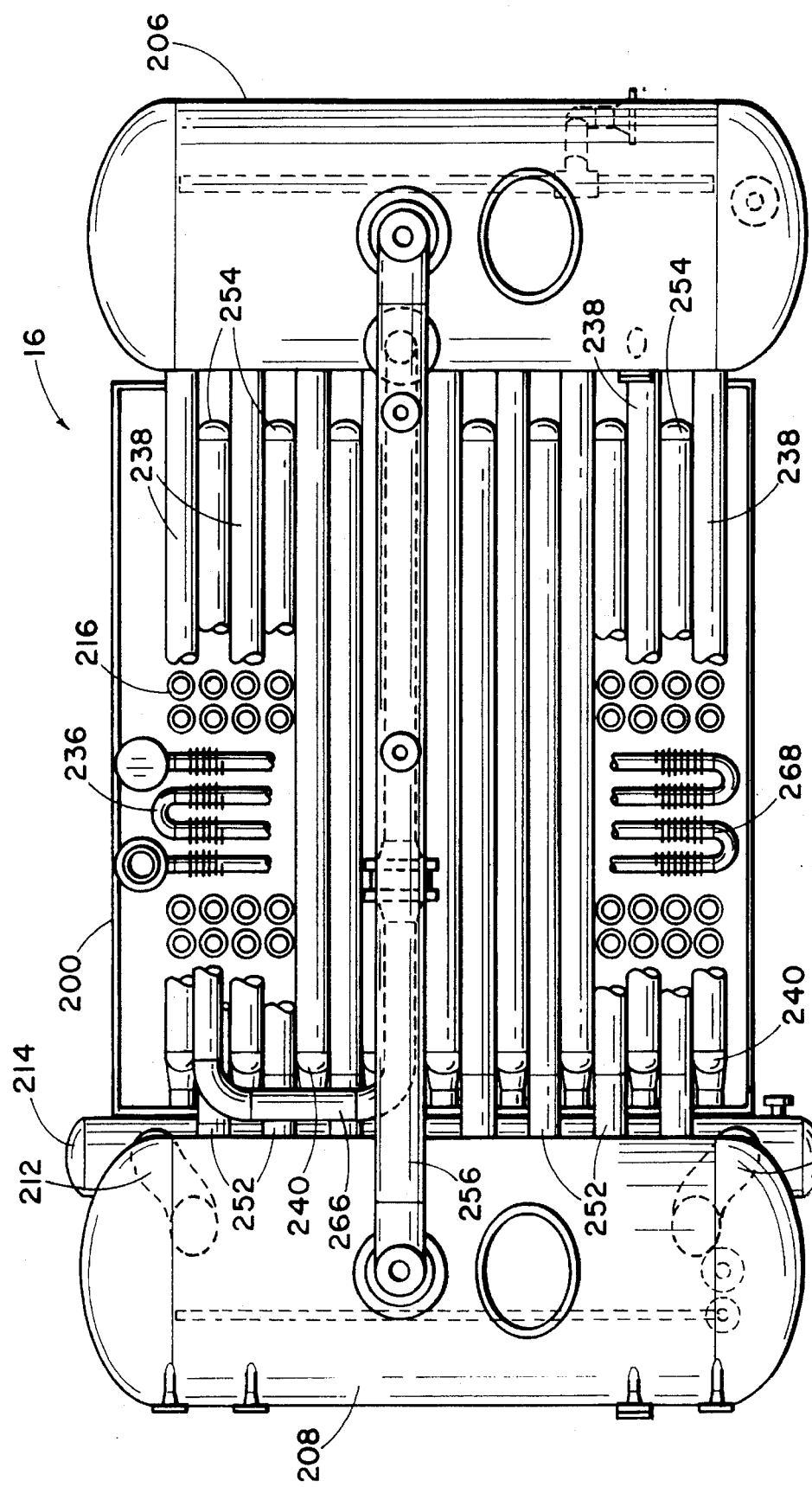
FIG. 15 provides a cutaway top view of boiler assembly 16.
Figure 16:
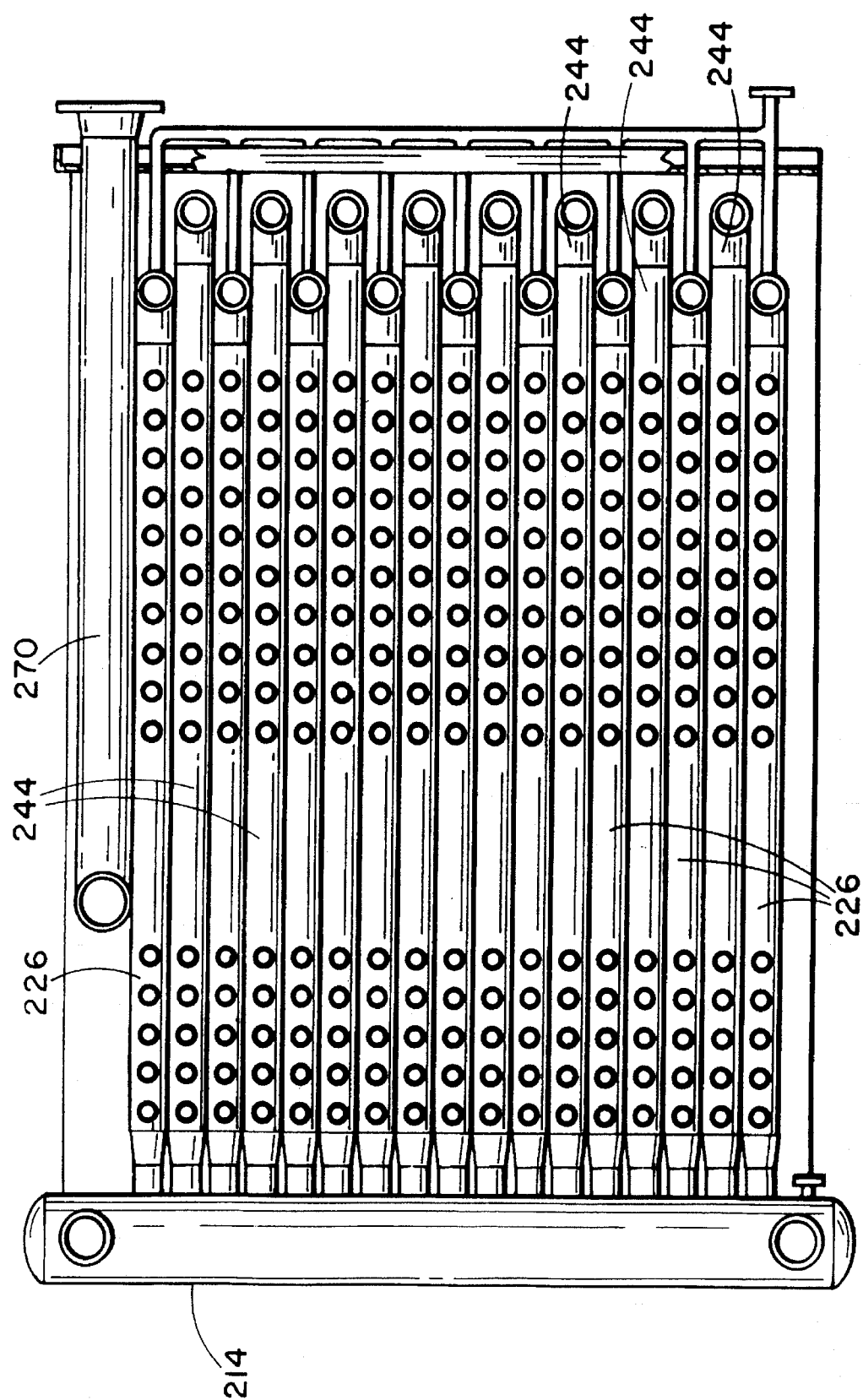
FIG. 16 provides a cutaway top view of boiler assembly 16 taken along line 16—16 shown in FIG. 14.
Figure 17:
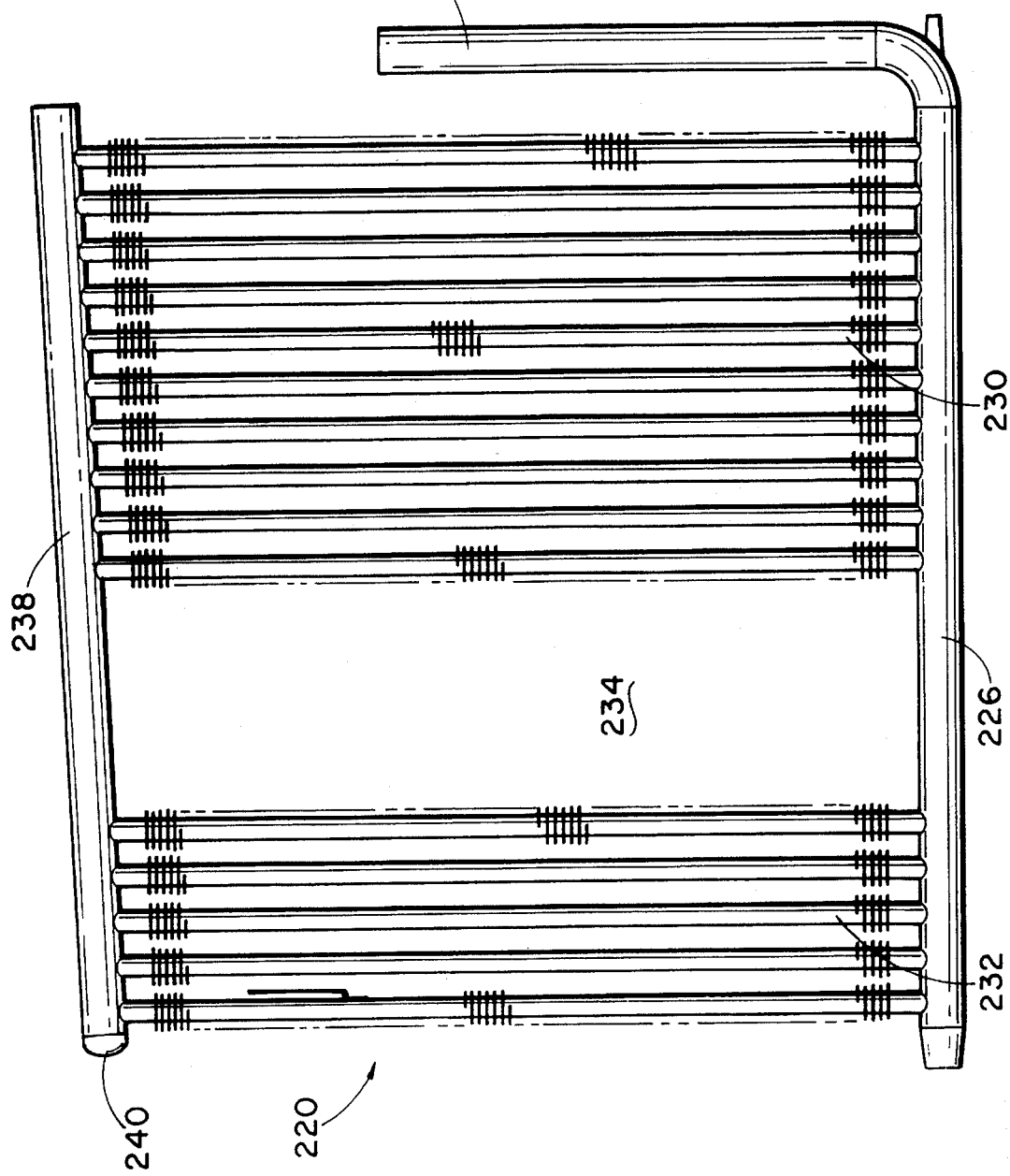
FIG. 17 provides an elevational side view of a first vertical tube row arrangement 220 used in boiler assembly 16.
Figure 18:
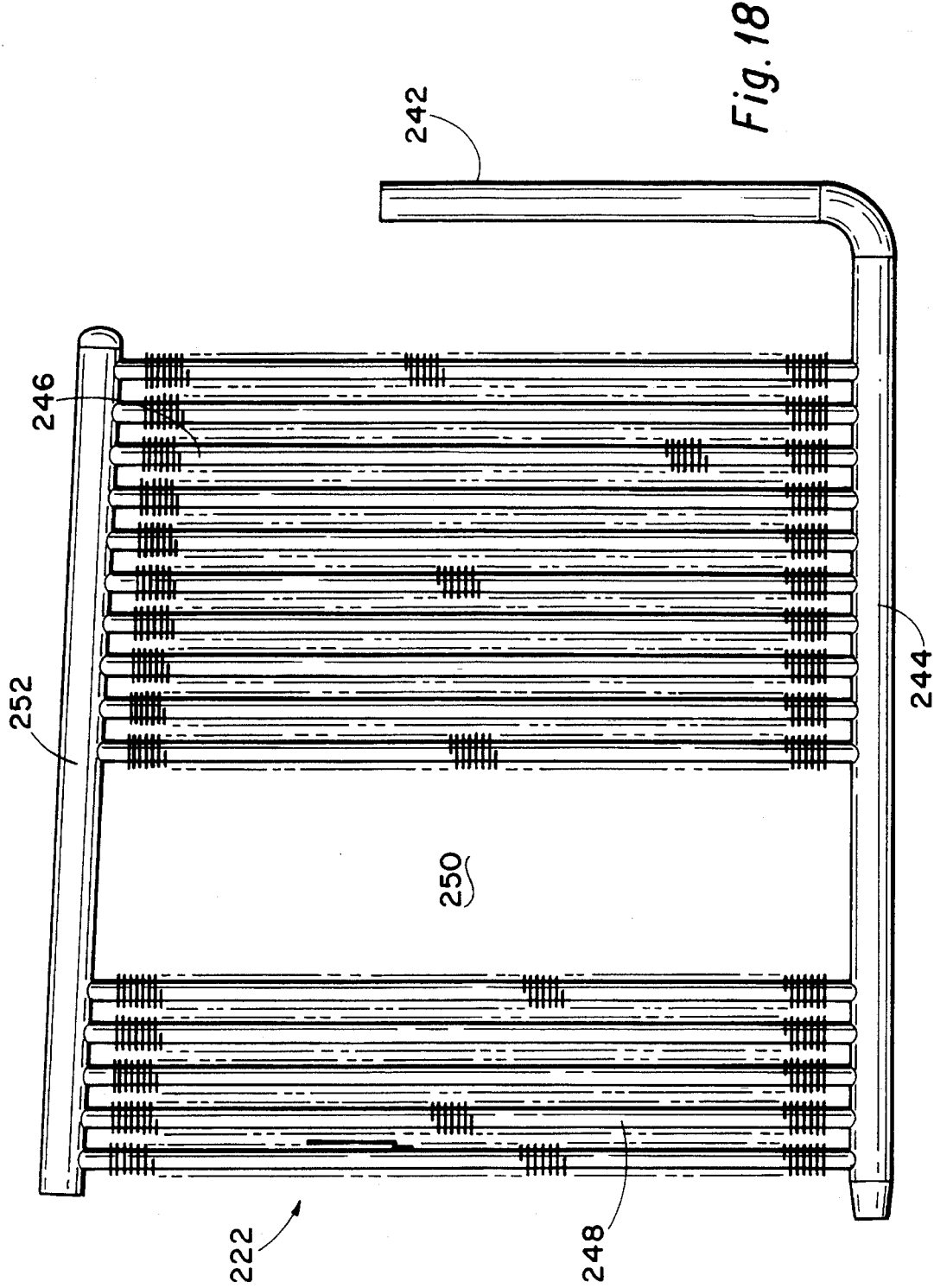
FIG. 18 provides an elevational side view of a second vertical tube row arrangement 222 used in boiler assembly 16.

As indicated in FIGS. 14 and 15, steam superheating unit 236 extends over substantially the entire cross section of boiler housing 200 and is comprised of a plurality of laterally extending horizontal finned tubes 268. A superheated steam product conduit 270 extends from the bottom of superheating unit 236.

When boiler 16 is placed in operation, steam from steam drums 206 and 208 flows via conduits 256 and 266 to steam superheating unit 236. As the steam from steam drums 206 and 208 travels through superheating unit 236, it is superheated by the exhaust gas stream flowing through boiler housing 200. The resulting superheated steam product is delivered from the superheating unit to the host facility via superheated steam product discharge conduit 272.

In order to protect the tubes of steam superheating unit 236 from overheating, steam superheating unit 236 is positioned downstream of tubes 232 and 248 in gaps 234 and 250. The flow of liquid and the occurrence of liquid vaporization in vertical tubes 232 and 248 lowers the skin temperatures of tubes 232 and 248 sufficiently to prevent these tubes from overheating. However, the flow of steam through superheating tubes 268 does not operate to substantially lower the skin temperatures of tubes 268. Given the typically extremely high temperature of the exhaust gas delivered to boiler 16 from engines 12 and 14, the skin temperatures of superheater tubes 268 would typically exceed tolerable limits if these tubes were immediately exposed to the exhaust gas stream flowing into boiler 16. Thus, a sufficient number of vertical tubes 232 and 248 are positioned upstream of superheating unit 236 to reduce the temperature of the exhaust gas stream entering superheating unit 236 sufficiently to prevent superheating tubes 268 from overheating.

Figure 21:
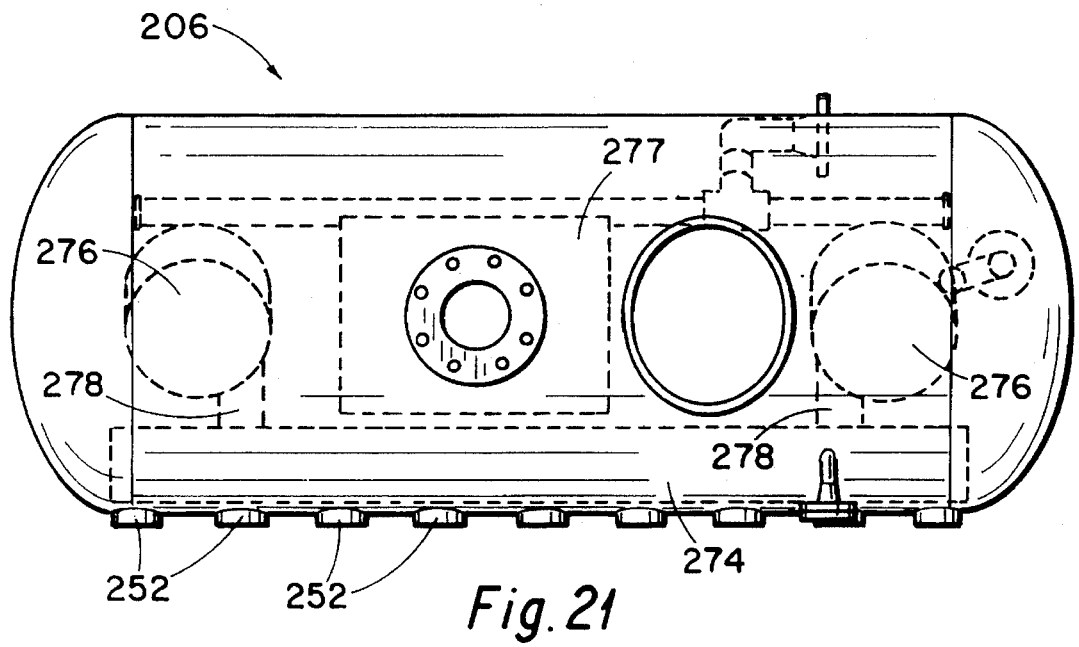
FIG. 21 provides a top view of steam drum 206.
Figure 20:
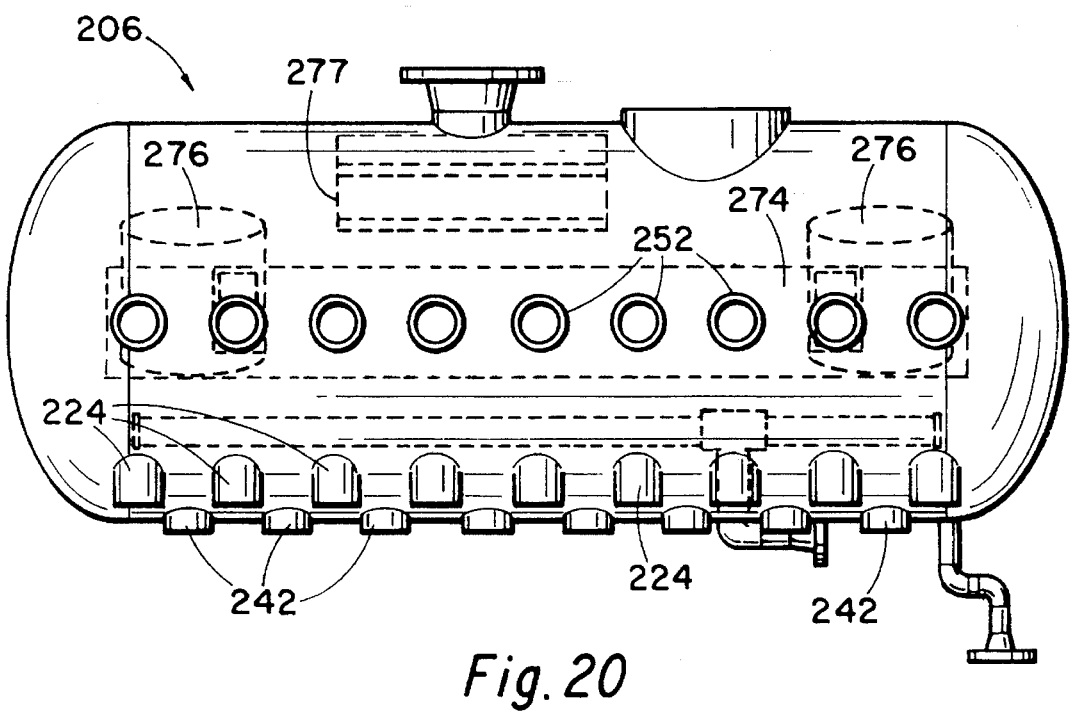
FIG. 20 provides an elevational side view of a steam drum used in inventive boiler assembly 16.

As indicated in FIGS. 14, 20, and 21, the interior of steam drum 206 includes: an elongate box 274 attached to an interior side of steam drum 206; two cyclone drums 276 connected to box 274 via inlet ducts 278; and a mist pad 277 positioned beneath the steam outlet of steam drum 206. Top conduits 252 of tube arrangements 222 are connected to drum 206 such that the product from each of these tubes flows into box 274 of steam drum 206. The material collected in box 274 then flows through ducts 278 and into cyclone drums 276. Cyclone drums 276 operate to remove any water remaining in the steam product such that the water drops to the bottom of steam drum 206 and the steam product flows to the top of steam drum 206. Demister pad 277 operates to remove substantially any water mist remaining in the steam product before the steam product flows into steam conduit 256.

The internal components provided in steam drum 208 are substantially the same as those provided in steam drum 206.

Due to its novel design, inventive boiler assembly 16 is a very compact boiler system which provides a very high relative effective heat transfer area. Such characteristics allow very efficient use of trailer space. Thus, inventive boiler assembly 16 is ideally suited for use in the inventive mobile cogeneration apparatus.

Inventive cogeneration apparatus 2 further includes an economizer 286 positioned adjacent boiler 16 for preheating feed water using the exhaust gas flowing from exhaust gas outlet 204 of boiler 16. Economizer 286 is a typical economizer arrangement which comprises a housing 288 having a plurality of horizontal finned tubes 284 extending across the interior thereof. Economizer 286 further includes a feedwater inlet 290 and a warm feedwater outlet 292. A feedwater supply conduit 294 is connected to inlet 290 for delivering feedwater to economizer 286. A conduit 296 is connected between feedwater outlet 292 of economizer 286 and the lower side portion of steam drum 206 for delivering warm feedwater from economizer 286 to steam drum 206. A duct 300 is connected between exhaust gas outlet 204 of boiler 16 and the exhaust gas inlet 302 of economizer 286 for delivering exhaust gas from boiler 16 to economizer 286.

Economizer 286 has an exhaust gas outlet 303 located on the top thereof which is connected to roof frame 24 of trailer 4. An exhaust gas stack 304 is removably associated with outlet 303 of economizer 286 for discharging the exhaust gas flowing through boiler 16 and economizer 286 to the atmosphere. Exhaust gas stack 304 is preferably bolted to roof frame 24 of trailer 4 such that stack 304 can be removed from the roof of trailer 4 before transporting the inventive cogeneration apparatus to another location. An opening is provided in top frame 24 such that the exhaust gas outlet 303 of economizer 286 is in fluid communication with exhaust gas stack 304.

As will be appreciated by those skilled in the art, standard instrumentation, controls, and equipment (e.g., microprocessor based programmable logic controllers, person computer operator interface stations, one or more hard-wired emergency shutdown systems, etc.) will preferably be provided for automatically monitoring and controlling inventive cogeneration apparatus 2. As indicated in FIGS. 1B and 2B, space is preferably provided at the front 305 of trailer 4 for housing the various instruments, controls, and components selected for controlling and monitoring the inventive system and for linking the inventive system with the host facility.

Figure 22:
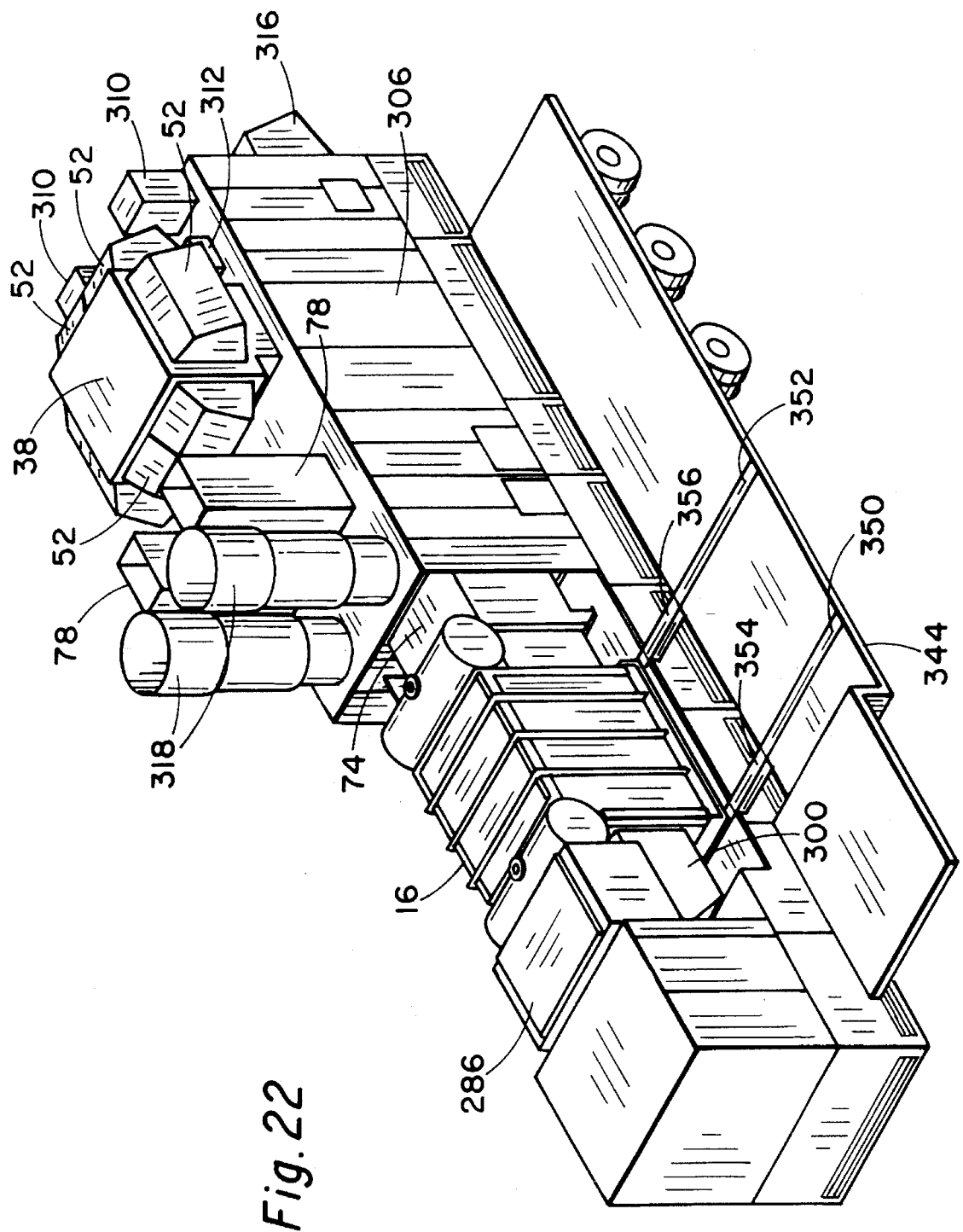
FIG. 22 provides a perspective view illustrating the removal of boiler assembly 16 from inventive cogeneration apparatus 2.

As indicated in FIGS. 2, 3, and 22, various roof and side panels 306 can be provided which are removably attachable to trailer frames 24 and 26 for housing and protecting the various components of inventive cogeneration apparatus 2 during transport and use. Various doors and openings 308 can be provided in these panels as necessary to provide quick access to those components of the system which must be frequently used, monitored, repaired, and/or maintained. Removable panels are also preferably provided such that a generator 8 or 10, an engine 12 or 14, or boiler 16 can be removed from or remounted on a trailer 4 while the remainder of apparatus 2 continues to operate. The removal and remounting of boiler 16 on trailer 4 is discussed hereinbelow.

Any one of generators 8 and 10 and engines 12 and 14 can be conveniently removed and/or remounted on trailer 4, for example, by removing the necessary access panels from the trailer frame, disconnecting any wiring and/or piping associated with the generator or engine, disconnecting the generator or engine from the support structure and from all associated equipment, and then hoisting the generator or engine using a portable monorail system. Lifting lugs are preferably provided as necessary on each generator and engine to allow easy lifting.

In addition to the above, inventive cogeneration apparatus 2 preferably includes: two lube oil coolers 310 which are removably bolted to roof frame 24; two neutral grounding resistors 312 which are removably bolted to roof frame 24 and are operably associated respectively with generators 8 and 10; two grounding transformers 313 positioned in the floor of trailer 4 and operably associated respectively with generators 8 and 10; two surge capacitor and arrestor assemblies 311 which are removably connected to roof frame 24 and are operably associated respectively with generators 8 and 9; two housing ports 314 and associated rainhoods 316 provided in the trailer housing to provide ventilation for generators 8 and 10; and two ventilation fan assemblies 318 which are removably bolted to top frame 24 and which are operable for ventilating the trailer housing. All components mounted on top of roof frame 24 are preferably removed prior to transporting the inventive cogeneration apparatus to another location.

Each ventilation fan assembly preferably comprises: an internal fan 320 and associated electric motor 322; a silencer section 324 composed of a duct having an acoustical liner;

and a butterfly-type damper 326 operably installed above silencer section 324.

Each lube oil cooler 310 preferably contains an electrical motor and fan and includes an oil inlet port and an oil outlet port. The oil inlet and outlet ports of lube oil coolers 310 are associatable, using tubing or similar conduit means, with corresponding lube oil connections provided on the Kawasaki M1A-13A engines.

Figure 23:
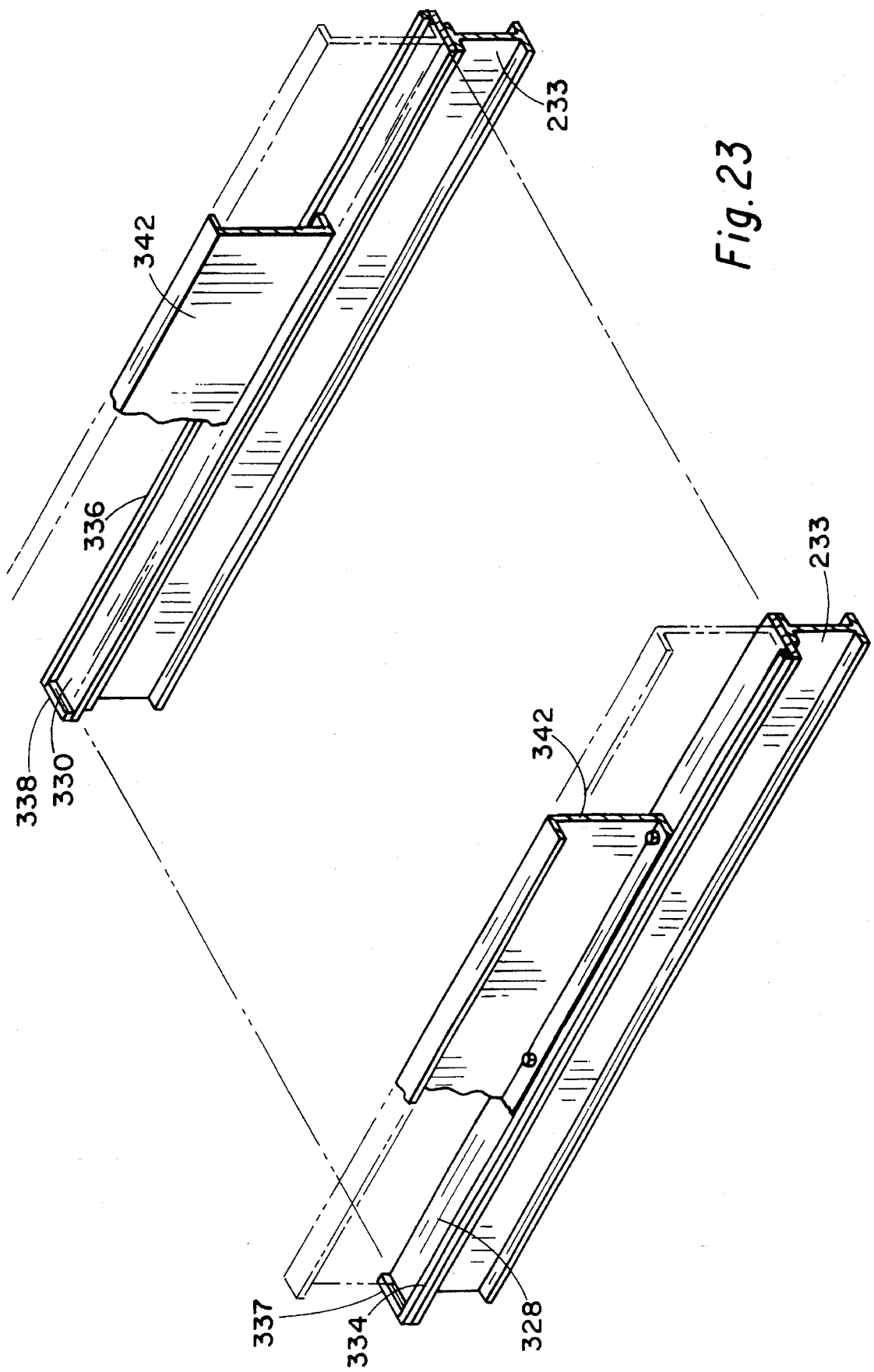
FIG. 23 illustrates structures preferred for use in mounting boiler assembly 16 in inventive apparatus 2.

The removal and remounting of boiler assembly 16 on trailer 4 is generally depicted in FIG. 22. As illustrated in FIGS. 1B and 23, boiler 16 is preferably mounted on trailer 4 using a pair of parallel elongate plate members 328 and 330 which are mounted in transverse position across the floor of trailer 4. Each of members 328 and 330 is preferably mounted on top of a structural framing member (e.g., an I-beam) 233 which is embedded in floor frame 6. Upwardly extending guide bars 334 and 336 are attached to the outside edges of plate members 328 and 330. Parallel plate members 328 and 330 are spaced apart on trailer 4 such that the distance between guide bars 334 and 336 is slightly larger than the overall distance between the outside edges of base members 342 of boiler 16. Thus, boiler 16 can be removed from or mounted on trailer 4 by sliding the base members 342 of boiler 16 on the smooth upper surfaces of plate members 328 and 330. Guide bars 334 and 336 operate to ensure that base members 342 of boiler 16 remain on plate members 328 and 330 during such sliding operations. Stops 337,339 are attached at the back ends of plate members 328 and 330 to halt the sliding movement of boiler 16 when boiler 16 is being positioned on members 328 and 330.

As shown in FIG. 22, boiler 16 can be conveniently removed from trailer 4 by: (a) removing conduits 256 and 266 from the top of boiler assembly 16; (b) removing the side and roof panels which surround boiler 16; (c) removing any remaining enclosure framing from the boiler area; (d) positioning a maintenance trailer 344 adjacent to trailer 4, maintenance trailer 344 preferably having parallel plate member and guide bar structures 350 and 352 mounted thereon which correspond to the plate members 328 and 330 and guide bars 334 and 336 of trailer 4; (e) connecting a pair of flat structural bridges 354 and 356 between plate members 328 and 330 and plate members 350 and 352; (f) disconnecting boiler 16 from ducts 74 and 298 and from all remaining piping and electrical systems; and then (g) sliding boiler 16 from trailer 4 to maintenance trailer 344.

As will be apparent, boiler 16 can be remounted on trailer 4 using a similar procedure.

The inventive cogeneration apparatus is particularly well-suited for providing base load electrical power and steam needs. Apparatus 2 will normally be operated using only one engine/generator pair with the other engine/generator pair being maintained on standby in case the first engine/generator pair malfunctions. When additional electrical power is needed, both engine/generator pairs can be placed in operation. Assuming that all of the exhaust gas generated by engines 12 and 14 is delivered to boiler 16, the steam output of inventive apparatus 2 will also increase when both engine/generator pairs are placed in operation. The steam output of apparatus 2 can also be increased at any electrical power generation level by adding additional heat to the engine exhaust gas using duct burner 100. As discussed above, the steam output of inventive apparatus 2 can also be at least partially reduced at any electrical power generation level by diverting a desired portion of the exhaust gas away from boiler 16 using one or both of diverter valves 72.

As will be readily apparent to those skilled in the art, inventive cogeneration apparatus 2 will also include standard piping and wiring systems suitable for: receiving and distributing combustible fuel as needed within the system; receiving boiler feedwater; delivering the steam and electrical products of the inventive system; automatically operating, controlling, and monitoring the various system components; etc.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A mobile cogeneration apparatus comprising:

a support structure having a plurality of wheels operably associated therewith for moving said support structure;

a first electrical generator mountable on said support structure;

a second electrical generator mountable on said support structure;

a first engine mountable on said support structure and associatable with said first electrical generator such that said first engine is operable for driving said first electrical generator, said first engine having an exhaust gas outlet;

a second engine mountable on said support structure and associatable with said second electrical generator such that said second engine is operable for driving said second electrical generator, said second engine having an exhaust gas outlet;

a boiler mountable on said support structure, said boiler having an exhaust gas inlet;

conduit means for conducting exhaust gas from said exhaust gas outlets of said engines to said exhaust gas inlet of said boiler;

discharge means for selectively discharging at least a portion of said exhaust gas before said portion of exhaust gas enters said exhaust gas inlet of said boiler; and diverter means, positionable in said conduit means, for selectively diverting said portion of said exhaust gas to said discharge means.

2. An apparatus as described in claim 1 wherein said diverter means includes at least one diverter valve, said diverter valve comprising:

a housing having an inlet port, a first outlet port, and a second outlet port;

a valve element support member pivotably mountable in said housing; and a valve element associatable with said valve element support member by means of a spherical bearing assembly, said valve element being positionable, by pivoting said valve element support member, for selectively sealing said outlet ports such that, when said valve element is positioned to fully close a selected one of said outlet ports, the other of said outlet ports is open.

3. An apparatus as described in claim 2 wherein:

said diverter valve further comprises a first sealing means positionable in said housing around said first outlet port and said diverter valve further comprises a second sealing means positionable in said housing around said second outlet port, wherein, as said valve element is positioned to close said first outlet port, said valve element will pivot with respect to said valve element support member as necessary by means of said spherical bearing assembly such that said valve element sealingly contacts said first sealing means around substantially the entire periphery of said first outlet port and as said valve element is positioned to close said second outlet port, said valve element will pivot with respect to said valve element support member as necessary by means of said spherical bearing assembly such that said valve element sealingly contacts said second sealing means around substantially the entire periphery of said second outlet port.

4. An apparatus as described in claim 1 further comprising:

a first mounting member secured to said support structure and a second mounting member secured to said support structure such that said second mounting member is spaced apart from said first mounting member, said first mounting member having an upwardly extending side portion and a substantially planar surface, said substantially planar surface extending horizontally from said side portion toward said second mounting member, said second mounting member having an upwardly extending side portion and a substantially planar surface, said substantially planar surface of said second mounting member extending horizontally from said side portion of said second mounting member toward said first mounting member, and said boiler having a base structure, wherein said side portion of said first mounting member is spaced apart from said side portion of said second mounting member by a distance corresponding to the width of said base structure of said boiler such that said boiler can be mounted on and removed from said support structure by sliding said base structure of said boiler on top of said substantially planar surfaces with said base structure positioned between said upwardly extending side portions.

5. An apparatus as described in claim 1 wherein said boiler comprises:

a boiler housing;

a first drum;

a second drum;

a first set of vertical boiler tubes positioned inside said boiler housing;

a second set of vertical boiler tubes positioned inside said boiler housing;

first conduit means for conducting water from said first drum to said first set of tubes;

second conduit means for conducting water between said drums and for conducting water to said second set of tubes;

third conduit means for conducting substantially all of the steam generated in said first set of tubes from said first set of tubes to one of said first and second drums; and fourth conduit means for conducting substantially all of the steam generated in said second set of tubes from said second set of tubes to the other of said first and second drums.

6. An apparatus as described in claim 5 wherein:

said boiler housing has an exhaust gas outlet;

said exhaust gas inlet is provided in said boiler housing;

said boiler further comprises a superheater means, positioned in said boiler housing, for superheating steam from said drums;

at least one of said vertical boiler tubes in said first set of vertical boiler tubes is positioned between said exhaust gas inlet of said boiler housing and said superheater means;

a plurality of said vertical boiler tubes in said first set of vertical boiler tubes are positioned between said superheater means and said exhaust gas outlet of said boiler housing;

at least one of said vertical boiler tubes in said second set of vertical boiler tubes is positioned between said exhaust gas inlet of said boiler housing and said superheater means; and a plurality of said vertical boiler tubes in said second set of vertical boiler tubes are positioned between said superheater means and said exhaust gas outlet of said boiler housing.

7. An apparatus as described in claim 1 wherein:

said conduit means includes first conduit means for conducting exhaust gas from said exhaust gas outlet of said first engine to said exhaust gas inlet of said boiler;

said conduit means further includes second conduit means for conducting exhaust gas from said exhaust gas outlet of said second engine to said exhaust gas inlet of said boiler;

said diverter means comprises a first diverter valve positioned in said first conduit means, said first diverter valve being operable for diverting at least a portion of said exhaust gas from said exhaust gas outlet of said first engine to said discharge means; and said diverter means further comprises a second diverter valve positioned in said second conduit means, said second diverter valve being operable for diverting at least a portion of said exhaust gas from said exhaust gas outlet of said second engine to said discharge means.

8. An apparatus as described in claim 1 further comprising:

a housing frame structure connected to said support structure, said housing frame structure including a top frame structure spaced above said support structure;

an air filter structure removably mountable on top of said frame structure; and second conduit means for conducting air from said air filter structure to an air inlet port in said first engine and to an air inlet port in said second engine.

9. A cogeneration apparatus comprising:

transporting means for transporting said cogeneration apparatus, said transporting means including a support frame;

electrical generator means, mountable on said support frame, for generating an electrical current;

driving means, mountable on said support frame, for driving said electrical generator means, said driving means producing an exhaust gas when operated;

heat recovery means, mountable on said support frame, for recovering heat from said exhaust gas;

exhaust discharge means for discharging at least a portion of said exhaust gas before said portion of said exhaust gas enters said heat recovery means; and diverter means for selectively diverting said portion of said exhaust gas to said exhaust discharge means, wherein said diverter means comprises:
- a housing having an inlet port, a first outlet port, and a second outlet port;
- a valve element support member pivotably mountable in said housing;
- a valve element; and
- a spherical bearing assembly operable for associating said valve element with said valve element support member,
- said valve element being positionable, by pivoting said valve element support member, for selectively sealing said outlet ports such that, when said valve element is positioned to fully close a selected one of said outlet ports, the other of said outlet ports is open.

10. The cogeneration apparatus of claim 9 wherein said valve element is positionable such that each of said outlet ports is at least partially open.

11. The cogeneration apparatus of claim 9 wherein said spherical bearing assembly is operable for allowing said valve element to pivot a sufficient distance in substantially any direction with respect to said valve element support member such that
- as said valve element is positioned to close said first outlet port, said valve element will pivot with respect to said valve element support member as necessary such that said valve element substantially fully contacts a first outlet port seal and
- as said valve element is positioned to close said second outlet port, said valve element will pivot with respect to said valve element support member as necessary such that said valve element substantially fully contacts a second outlet port seal,
- said first outlet port seal being positioned in said housing such that said first outlet port seal substantially completely surrounds said first outlet port and
- said second outlet port seal being positioned in said housing such that said second outlet port seal substantially completely surrounds said second outlet port.

12. A cogeneration apparatus comprising:
- transporting means for transporting said cogeneration apparatus, said transporting means including a support frame;
- electrical generator means, mountable on said support frame, for generating an electrical current;
- driving means, mountable on said support frame, for driving said electrical generator means, said driving means producing an exhaust gas when operated; and
- heat recovery means, mountable on said support frame, for recovering heat from said exhaust gas,
- wherein said heat recovery means is a boiler comprising:
  - a boiler housing;
  - a first drum;
  - a second drum;
  - a first set of vertical boiler tubes positioned inside said boiler housing;
  - a second set of vertical boiler tubes positioned inside said boiler housing;
  - first conduit means for conducting water between said drums and for conducting water to said first set of tubes;
  - second conduit means for conducting water between said drums and for conducting water to said second set of tubes;
  - third conduit means for conducting substantially all of the steam generated in said first set of tubes from said first set of tubes to one of said first and second drums; and
  - fourth conduit means for conducting substantially all of the steam generated in said second set of tubes from said second set of tubes to the other of said first and second drums.

13. The cogeneration apparatus of claim 12 wherein:
- said boiler housing has an inlet wherein said exhaust gas enters said boiler housing;
- said boiler housing has an outlet wherein said exhaust gas exits said boiler housing;
- said boiler further comprises a superheater means, positioned in said boiler housing, for superheating steam from said drums;
- said first set of tubes comprises (a) at least one vertical tube positioned between said inlet of said boiler housing and said superheater means and (b) a plurality of vertical tubes positioned between said outlet of said boiler housing and said superheater means; and
- said second set of tubes comprises (a) at least one vertical tube positioned between said inlet of said boiler housing and said superheater means and (b) a plurality of vertical tubes positioned between said outlet of said boiler housing and said superheater means.

14. A cogeneration apparatus comprising:
- transporting means for transporting said cogeneration apparatus, said transporting means including a support frame;
- electrical generator means, mountable on said support frame, for generating an electrical current;
- driving means, mountable on said support frame, for driving said electrical generator means, said driving means producing an exhaust gas when operated; and
- heat recovery means, mountable on said support frame, for recovering heat from said exhaust gas,
- said electrical generator means comprising a first electrical generator and a second electrical generator,
- said driving means comprising a first engine operably associatable with said first electrical generator for driving said first electrical generator,
- said driving means further comprising a second engine operably associatable with said second electrical generator for driving said second electrical generator,
- said first engine and said first electrical generator can be operated simultaneously with said second engine and said second electrical generator, and
- said first engine and said first electrical generator can be operated when said second engine and said second electrical generator are not in operation.

15. The cogeneration apparatus of claim 14 wherein:
- said first engine has an exhaust gas outlet;
- said second engine has an exhaust gas outlet;
- said heat recovery means has an exhaust gas inlet;
- said cogeneration apparatus further comprises first conduit means for conducting exhaust gas from said exhaust gas outlet of said first engine to said exhaust gas inlet;

said cogeneration apparatus further comprises second conduit means for conducting exhaust gas from said exhaust gas outlet of said second engine to said exhaust gas inlet;

said cogeneration apparatus further comprises exhaust discharge means for discharging at least a portion of the exhaust gas from said engines before said portion of exhaust gas enters said exhaust gas inlet of said heat recovery means;

said cogeneration apparatus further comprises a first diverter valve positionable in said first conduit means, said first diverter valve being operable for selectively diverting at least a portion of the exhaust gas from said exhaust gas outlet of said first engine to said discharge means; and said cogeneration apparatus further comprises a second diverter valve positioned in said second conduit means, said second diverter valve being operable for selectively diverting at least a portion of the exhaust gas from said exhaust gas outlet of said second engine to said discharge means.

* * * * *

UNITED STATES PATENT AND TRADEMARK OFFICE
CERTIFICATE OF CORRECTION

PATENT NO. : 5,517,822
DATED : May 21, 1996
INVENTOR(S) : Haws, et al.

It is certified that error appears in the above-indentified patent and that said Letters Patent is hereby corrected as shown below:

In the title col. 1, line 1, change "CONGENERATION" to --COGENERATION--.

Signed and Sealed this

Twentieth Day of August, 1996

Attest:

BRUCE LEHMAN

*Attesting Officer*     *Commissioner of Patents and Trademarks*